Figure 1:
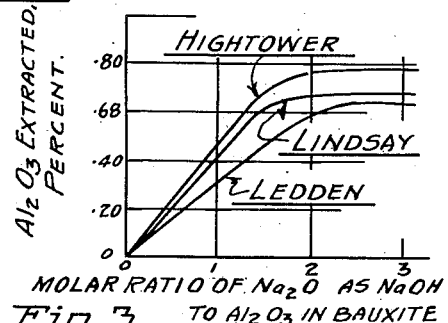

Aug. 22, 1950     E. P. FLINT ET AL     2,519,362
METHOD OF REDUCING THE CONCENTRATION OF SILICA
IN SODIUM ALUMINATE SOLUTIONS
Filed Aug. 4, 1943     5 Sheets-Sheet 1

INVENTORS
EINAR P. FLINT
BY LEO SHARTSIS
LANSING S. WELLS
ATTORNEY

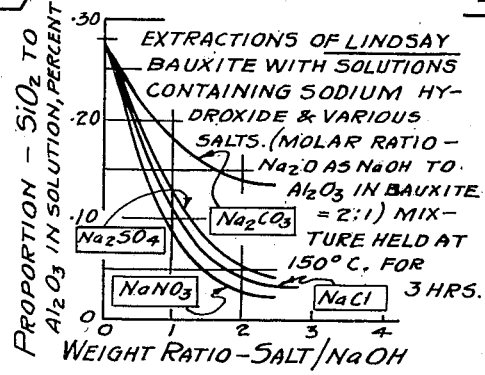
Fig. 6.
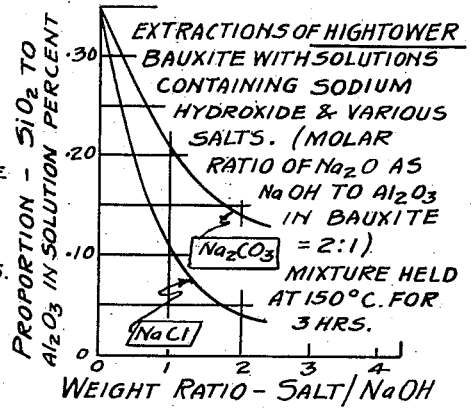
Fig. 7.
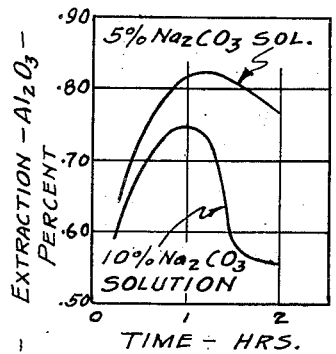
Fig. 9.
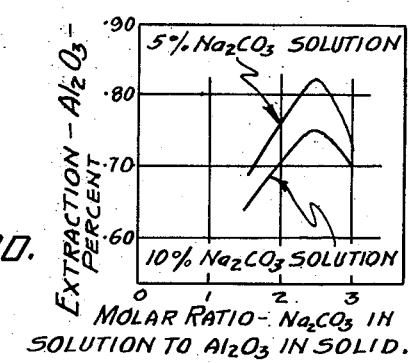
Fig. 10.
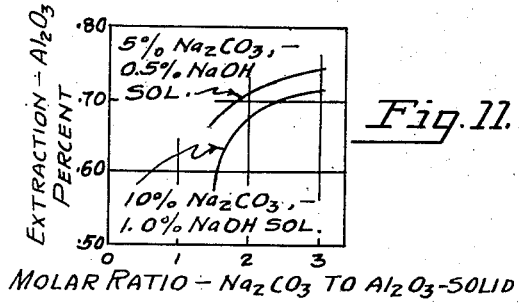
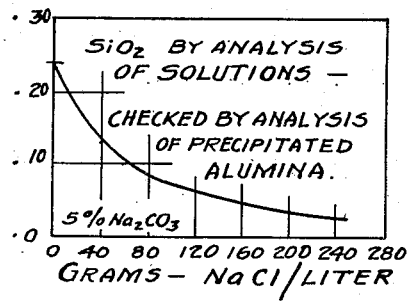
Fig. 12.
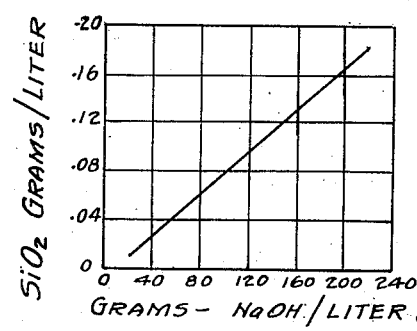
Fig. 13.
INVENTORS
BY EINAR P. FLINT
LEO SHARTSIS
LANSING P. WELLS
ATTORNEY

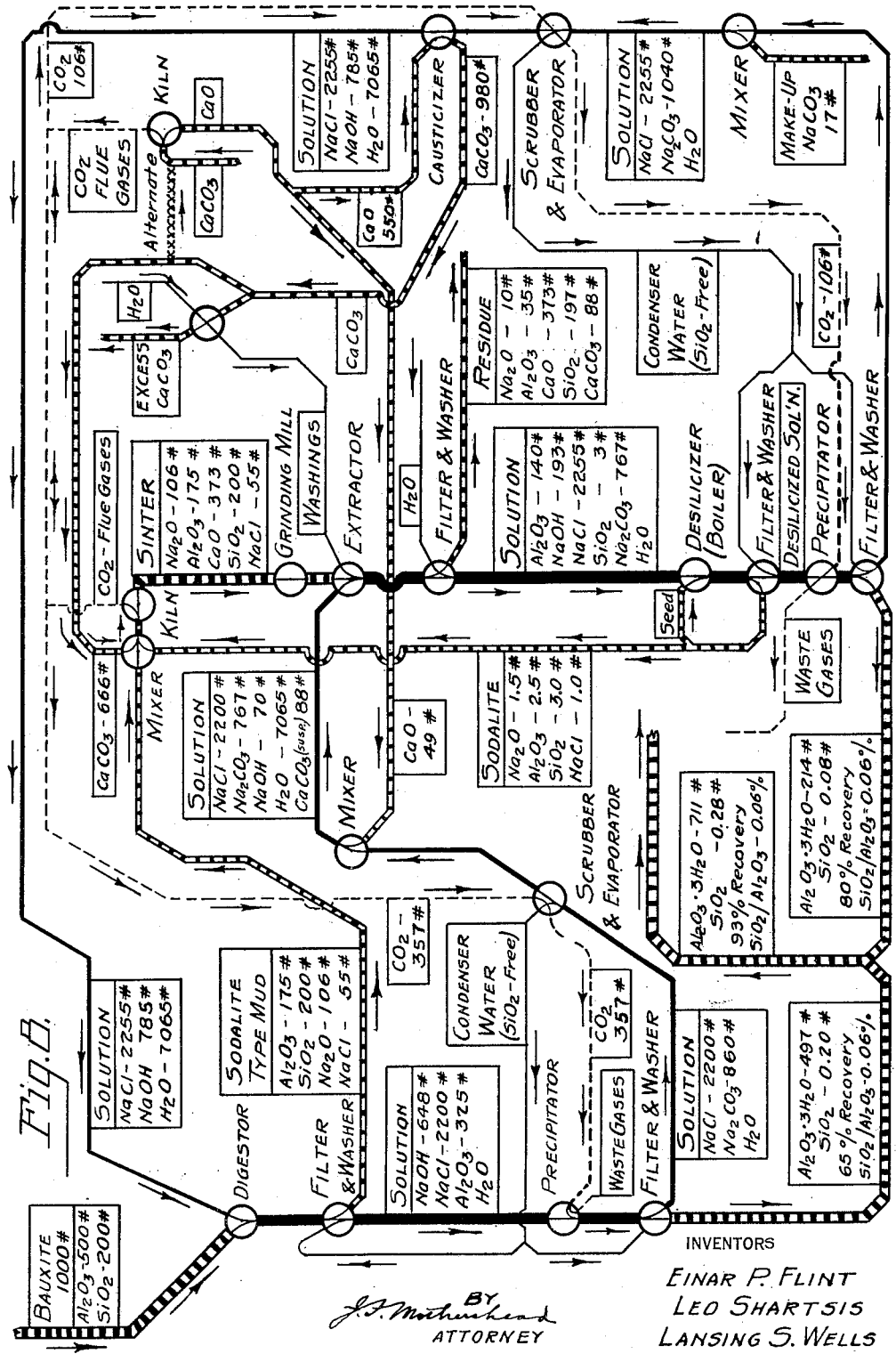

Aug. 22, 1950 — E. P. FLINT ET AL — 2,519,362
METHOD OF REDUCING THE CONCENTRATION OF SILICA
IN SODIUM ALUMINATE SOLUTIONS
Filed Aug. 4, 1943 — 5 Sheets-Sheet 4

INVENTORS
BY EINAR P. FLINT
LEO SHARTSIS
LANSING S. WELLS
ATTORNEY

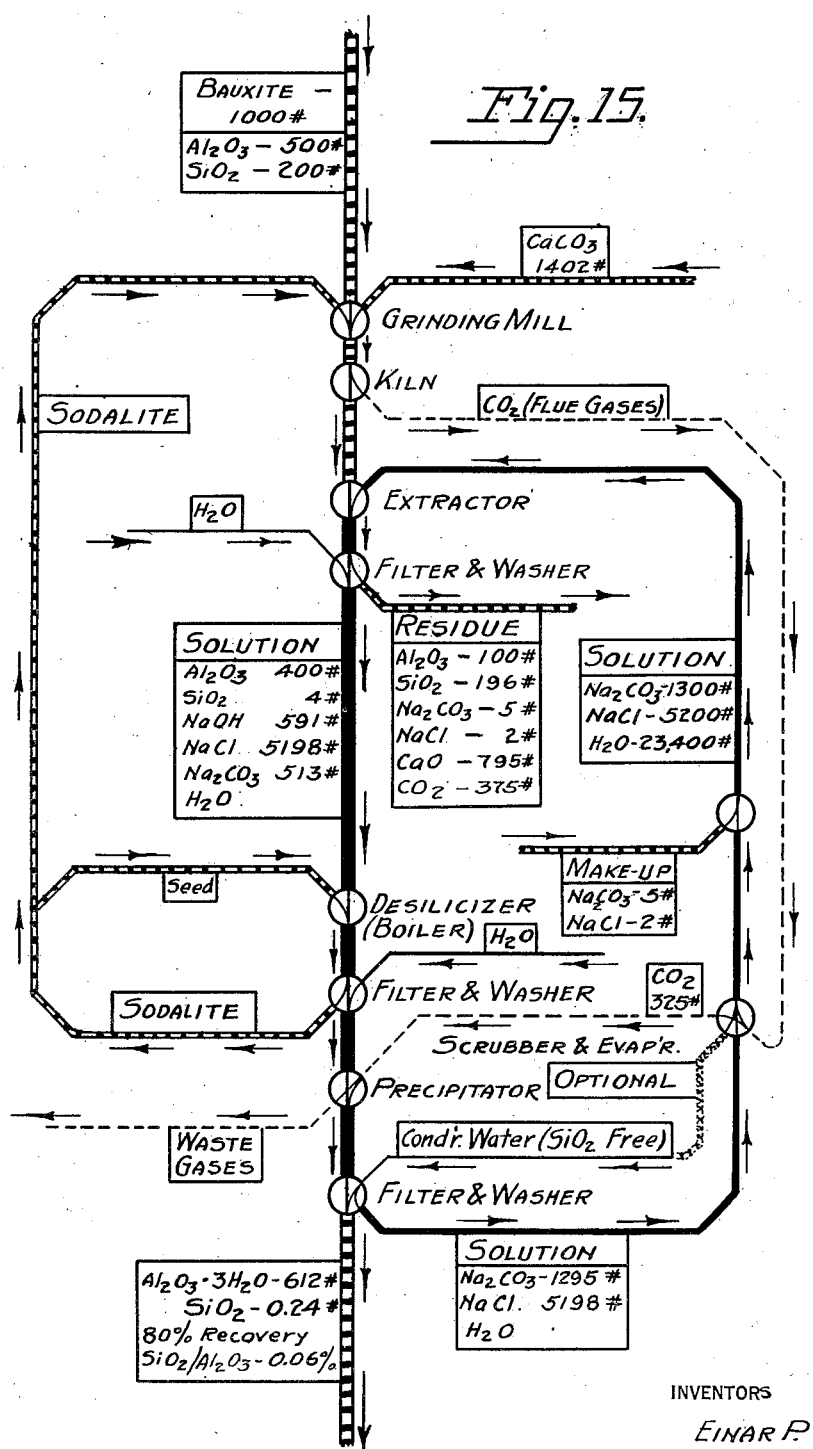

Patented Aug. 22, 1950

2,519,362

UNITED STATES PATENT OFFICE 2,519,362

METHOD OF REDUCING THE CONCENTRATION OF SILICA IN SODIUM ALUMINATE SOLUTIONS

Einar P. Flint, Washington, D. C., Leo Shartsis, Bethesda, Md., and Lansing S. Wells, Washington, D. C.

Application August 4, 1943, Serial No. 497,346

4 Claims. (Cl. 23—52)

(Granted under the act of March 3, 1883, as amended April 30, 1928; 370 O. G. 757)

The invention herein described may be made and used by or for the Government of the United States without payment to either of us of any royalty therefor in accordance with the provisions of the act of April 30, 1928 (ch. 460, 45 Stat. L. 467).

This invention relates to alkaline processes for extracting alumina, as from low-grade bauxites and clays, and aims generally to improve the same.

A principal object of the invention is to provide processes of the class described adapted to yield products of sufficient purity to meet the requirements for alumina to be used in the manufacture of aluminum by electrolytic reduction.

A further object is to provide a process which may be wholly independent of the use of high-grade bauxites.

An additional important object of the invention is to provide an improved method of desilicizing a solution containing silica, alumina, and soda, by adding to the solution a sodalitic-type or sodalitic salt-forming reagent to cause the silica to precipitate as a sodalitic-type salt of low solubility compared to the form of precipitate obtained in the ordinary Bayer or Pederson or like processes, preferably with seeding.

Other objects and advantages of the invention will be apparent from the following general and detailed descriptions of particular embodiments illustrating preferred applications of the invention to extraction of alumina from low-grade bauxite, recovery of alumina and soda from the residues remaining after extraction of the bauxite in accordance with the present invention, and extraction of alumina from clay in accordance with the present invention.

Our invention, as above mentioned, may be applied in various alkali-extraction processes with desirable results. For example, in the ordinary Bayer process of extracting alumina from bauxite, the bauxite, which contains the major part of its alumina in the form of gibbsite ($Al_2O_3.3H_2O$) or diaspore ($Al_2O_3.H_2O$) and the major part of its silica as alumino-silicates, particularly kaolinite ($Al_2O_3.2SiO_2.2H_2O$), when digested with sodium hydroxide solution at a temperature of about 150° C. yields a solution of sodium aluminate ($Na_2O.Al_2O_3$) and a "red mud." The sodium aluminate ($Na_2O.Al_2O_3$) solution is cooled, seeded with gibbsite ($Al_2O_3.3H_2O$), and crystallized to the equilibrium of gibbsite solubility at the temperature of final crystallization. The gibbsite is then calcined to $Al_2O_3$.

The silica content of the bauxite, on digestion, is believed to be converted for the most part, to hydrated sodium aluminum silicate (probably of the formula $Na_2O.Al_2O_3.2SiO_2.2H_2O$), which has a relatively low solubility in the solution and is renewed in the "red mud." The silica which remains dissolved corresponds to the solubility of the hydrated sodium aluminum silicate in the digestate and is largely retained in solution during the crystallizing out of gibbsite, which increases the causticity of the solution. When the NaOH in the digestate solution is neutralized with $CO_2$, very careful pH control must be exercised to prevent precipitation of silica along with gibbsite, if the precipitation is carried anywhere near completion.

In the application of the applicants' present discovery in this type of process, a considerable quantity, preferably a large excess at least equal to the concentration of the sodium oxides present, of a sodalitic-salt forming reagent herein generally termed $Na_xR$, as sodium (or potassium)-nitrate, -chloride, -bromide, -sulfate, -carbonate, and like salts, is added to the material being digested (a non-carbonate salt, herein termed $Na_xR'$ being preferred, as will hereinafter appear), with the result that the silica compound in the red mud is rendered sodalitic (e. g. of the probable formula $Na_2O.Al_2O_3.2SiO_2.\tfrac{2}{3}Na_xR$) and is much less soluble than the non-sodalitic compounds such as $Na_2O.Al_2O_3.2SiO_2.2H_2O$, so the silica concentration in the solution is reduced. This step is advantageous, and is particularly desirable when digesting by boiling rather than autoclaving, as the formation of a sodalitic red mud for our invention during the boiling operation leaves so little silica in the solution that it becomes feasible to carry the $CO_2$ neutralization of NaOH, for throwing down the alumina as gibbsite, much further in all cases without obtaining undue amounts of silica in the product. When the digestion was made in the presence of suitable concentrations of the monovalent sodalite-forming salts, more especially NaCl and $NaNO_3$, the precipitation of gibbsite may be carried practically to completion, as could not have been predicted prior to our research.

In the recovery of alumina and soda from the residues of the ordinary Bayer process, the red mud is calcined with lime to convert the sodium aluminum silicate to relatively inert dicalcium silicate and sodium aluminate, which can be leached out with water at a temperature well below boiling.

We contemplate that our discovery may be employed in this connection by extracting the sinter produced from the red mud of the ordinary Bayer process with a solution containing a concentration of sodalitic-salt forming reagent substantially as great as or greater than that of total NaOH, and then boiling the extract with a seed charge of sodalite-type compound to bring down its silica content sodalitically.

We prefer however, when applying our discovery to treatment of red mud, to apply it to sodalitic red mud obtained by our principal extraction, by calcining the sodalitic red mud with lime, and then leaching it with the salt solution from our principal extraction (after precipitation of alumina from it)—this salt solution being one in which the sodalitic-salt forming reagent is preferably a salt $Na_xR'$ other than the carbonate, and being used at about 50° C. or below—followed by boiling with a seed charge of the sodalite-type compound to bring down the silica as a highly insoluble sodalitic compound, after which the hydrated alumina may be precipitated with $CO_2$, leaving a solution of the salt, e. g. sodium chloride, and sodium carbonate which can be causticized with $Ca(OH)_2$ and returned to the first or principal extraction step of our process. Thus, in this second application of the invention the sodalitic-salt forming reagent $$(Na_xR')$$

again functions to convert the silica in solution to a sodalitic type compound, thus again enabling the $CO_2$ precipitation to be carried practically to completion without obtaining excess silica in the product.

Our invention is also applicable in the extraction of alumina from other aluminiferous material, as in the lime-sinter method of extracting alumina from low-grade bauxite or clay (kaolin or the like). In the ordinary lime-sinter process, for example, the crude low-grade bauxite or clay is sintered with lime to form calcium silicate and calcium aluminate, which sinter is extracted with $Na_2CO_3$ solution yielding a solution of sodium aluminate with dicalcium silicate and calcium carbonate as residues. Following a desilication treatment of the sodium aluminate solution its alumina content is precipitated as gibbsite by means of $CO_2$.

In applying our discovery to such a process the sodalitic-salt forming reagent employed $(Na_xR')$ is one other than the carbonate, because in the presence of dicalcium silicate, $Na_2CO_3$ in such large excess as is required to effectually desilicize by formation of the alkali carbonate sodalitic-compound, will decrease the yield of sodium aluminate solution, apparently as a result of its partially decomposing the dicalcium silicate. Accordingly, in any application of our process in which dicalcium silicate is a factor, a non-carbonate reagent $(Na_xR')$ such as NaCl, NaBr, $NaNO_3$ or the like is doubly preferred. In the application of our method to a lime-sinter process, the reagent $(Na_xR')$ is usually included in the $Na_2CO_3$ extractant solution, its presence during the extraction being tolerated in order to be able to use the $(Na_xR')$ solution from the tail end of the process, as will appear hereinafter. The $(Na_xR')$ is, so far as advantage is concerned, inert during the extraction step (it is slightly disadvantageous as it slightly decreases $Al_2O_3$ extraction). It is put in at this stage so it will be present in the extract to convert the dissolved silica into sodalitic-type compounds removable by boiling with sodalitic type seed to reduce the silica before the $CO_2$ treatment of the residual liquor. In this connection we have determined that sodalite and similar sodalitic-type compounds are less soluble at boiling temperature, and that the $CO_2$ treatment is best carried out at near boiling temperature, and thus contemplate such conditions in the preferred form of this application of our invention.

It will accordingly be seen from the foregoing general description, that our invention provides a new manner of reducing the silica content of alkaline aluminiferous extracts per se, which in its broader aspects is not limited in application to any one particular extraction process, although in particular applications its inclusion results in new and useful improvements of the combinations or sub-combinations thereof.

Figure 14:
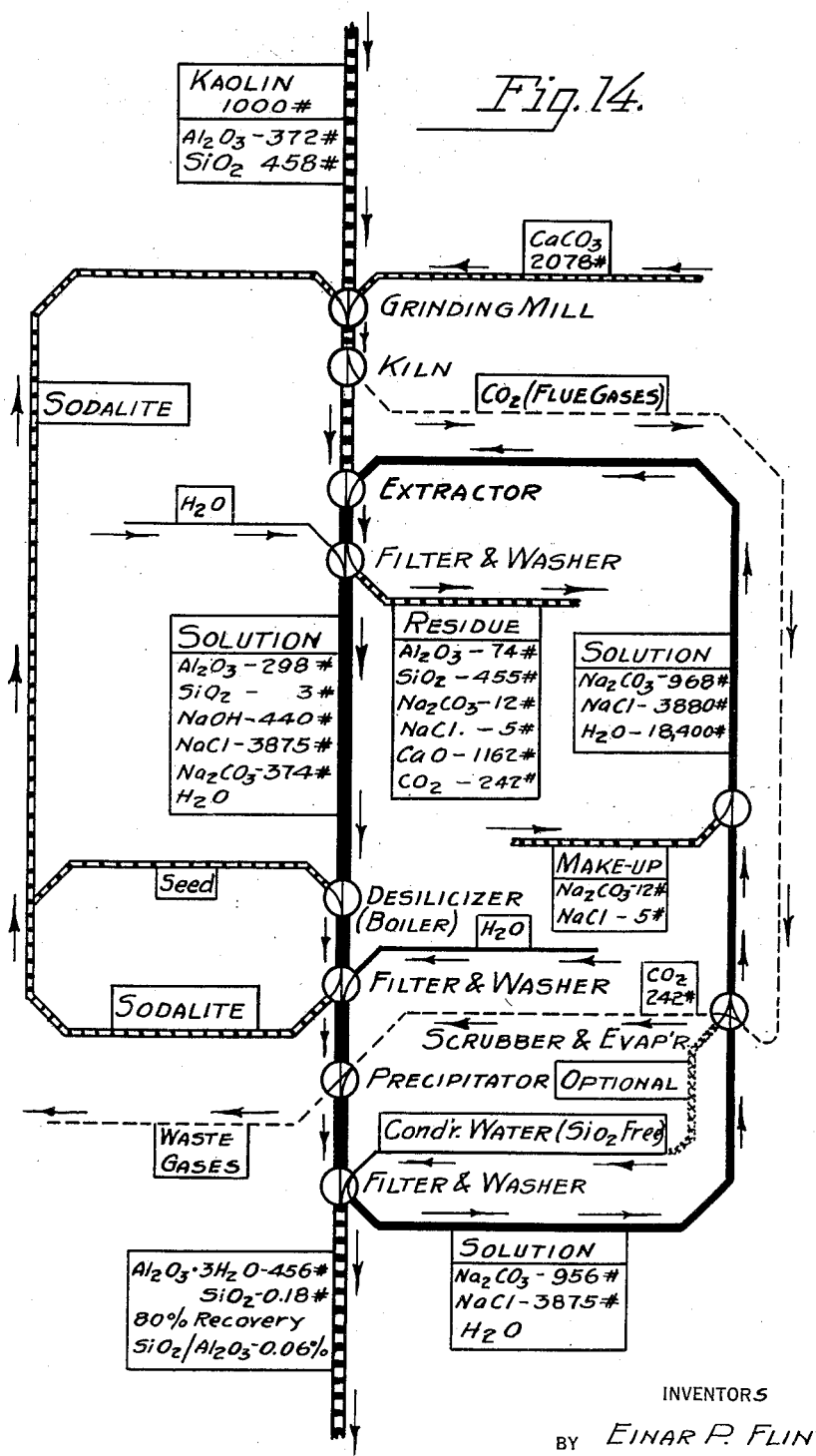

A more detailed understanding of the essential steps of the invention, its generic and specific aspects, and new combinations to which it contributes, will appear from the following general and detailed description of illustrative embodiments, in connection with the accompanying drawings in which Figs. 8, 14 and 15 are flow sheets of illustrative embodiments of complete extraction processes embodying our invention, with solids, liquids and gases shown respectively in chain-form, continuous, and dotted lines; while Figs. 1 to 7 and 9 to 13 are charts in the form of interpolated and extrapolated curves based on actual tests in the critical regions, showing preferred conditions for the several applications of our invention and the improved results achieved by such applications.

Referring first to Figs. 1–8 of the drawings, the novel features of the present invention are therein described in connection with a sodium hydroxide-bauxite extraction process, and as indicated in Fig. 8, reside principally in the composition of the solution used for extracting the alumina content of the raw material and in the method of recovering alumina and soda from the residues remaining after extraction. The extracting solution in the principal extraction step according to our invention consists of a mixture of sodium hydroxide and a silica depressing sodium salt. Various sodium salts, such as the chloride, nitrate, bromide, sulfate, or carbonate may be used, which in this description are represented as $Na_xR$. When these salts are present in sufficient concentration the amount of silica dissolved from bauxites is much less than when the extraction is carried out with sodium hydroxide solution alone, as in the Bayer process. The diminished concentration of silica in the presence of sodium salts as above mentioned, is believed to be caused by the combination of these salts with sodium aluminum silicate to form very slightly soluble compounds related to sodalite

$$3Na_2O.3Al_2O_3.6SiO_2.2NaCl$$

which may be generically represented by

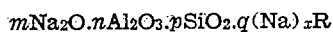
$$mNa_2O.nAl_2O_3.pSiO_2.q(Na)_xR$$

where $m$ appears to be 3, $n$ to be 3, $p$ to be 6, $q$ to be 2, and R may be Cl, $NO_3$, $SO_4$, $CO_3$, etc., and $x$ is the valence of the acid radical. Of the salts mentioned above, sodium chloride and sodium nitrate are indicated by our research to be the most effective in reducing the silica content of the alkali process extracts.

The same new principle is preferably used in the recovery of alumina and soda from the residue remaining after extraction of the bauxite with the sodium hydroxide-salt solution. This residue is mixed and burned with sufficient calcium carbonate (limestone) to convert the silica which it contains to dicalcium silicate. After grinding, the product is extracted with a solution containing a suitable concentration of the silica depressing sodium salt which may be the same salt used in the first stage in the case of a two-stage process and which, as above mentioned, is preferably not a carbonate. The salt preferred would ordinarily be sodium chloride which is cheap and plentiful and unpredictably effects materially better desilication than most other salts except sodium nitrate. The extract is then desilicized by boiling it with a seed charge of synthetic sodalite, preferably of fine grain and approaching the theoretical molar composition of the mineral. By this method of desilication, the present invention enables reduction of the amount of silica in solution to a few hundredths of a percent of the alumina concentration.

Modifications of the present new method may be used successfully for extracting alumina from clay or kaolin, as indicated in Figs. 9 to 14 herein, as well as for extracting alumina from low-grade bauxites and other aluminous materials (see Fig. 15). The first step in the modified procedure involves burning the aluminous material with sufficient limestone to convert its alumina to a calcium aluminate and its silica to dicalcium silicate. For mixing and burning the raw materials and grinding the product the equipment used in cement manufacture is suitable. The product is then extracted with a solution of sodium carbonate containing a relatively high concentration of sodium chloride, sodium nitrate, or some other sodium salt which in this instance, is preferably not a carbonate, for the reasons above mentioned, and is herein termed $Na_xR'$. To prevent the formation of compounds of the sodalite type during extraction, with consequent losses of alumina, soda, and sodium salt, the extraction temperature is preferably kept not much in excess of 50° C. The resulting extract is then boiled with a seed charge of synthetic sodalite or double salt of the sodalite type. As mentioned in connection with the embodiment of Fig. 8, this treatment reduces the amount of silica in solution to a few hundredths of a percent of the alumina concentration. Alumina may then be precipitated from solution with carbon dioxide.

By the processes described herein high recoveries of alumina, having a purity comparable to that of the product obtained in the Bayer process, can be obtained from both low-grade bauxites and clays, without the use of any high-grade bauxite.

Referring more specifically to the embodiment exemplified in Figs. 1–8, a detailed understanding of the method may best be gained from a consideration of the materials actually used and the procedures actually followed in our research.

The materials chosen for extraction were three Georgia bauxites of the compositions given in Table 1. Other materials used in the extractions included technical or C. P. grades of sodium hydroxide, sodium carbonate, sodium sulfate, sodium bromide, sodium chloride, and sodium nitrate.

Table 1.—Compositions of bauxites

| Oxide | Bauxite | | |
|---|---|---|---|
| | A[1] Percent | B[2] Percent | C[3] Percent |
| $SiO_2$ | 19.80 | 19.89 | 11.08 |
| $Al_2O_3$ | 44.14 | 50.57 | 56.18 |
| $Fe_2O_3$ | 9.61 | 1.26 | 1.18 |
| $TiO_2$ | 2.05 | 2.52 | 2.39 |
| $CaO$ | | 0.02 | 0.03 |
| $MgO$ | | 0.01 | 0.01 |
| Ignition Loss | 23.58 | 25.30 | 28.38 |
| Total | 99.18 | 99.57 | 99.25 |

[1] A—Georgia bauxite from Ledden property.
[2] B—Georgia bauxite from Lindsay property.
[3] C—Georgia bauxite from Hightower property.

The procedure involved boiling or autoclaving the finely-ground bauxite with a sodium hydroxide solution containing various proportions of sodium salts. Extractions at boiling temperatures were made in iron containers fitted with reflux condensers and those at 150° C. in a bomb-type autoclave having a capacity of 1 liter. After a heating period of 3 hours the residues were separated from the solutions by filtration, washed with water and the combined extracts and washings analyzed gravimetrically for $SiO_2$ and $Al_2O_3$. In some cases the approximate concentrations of NaOH and $Na_2CO_3$ were determined by titration of an aliquot of the solution with standard acid. Operations were also carried out in which the alumina in solution was precipitated with carbon dioxide gas under various conditions. The variations in composition of both the precipitate and the solution were followed by chemical analyses during this process. Microscopical examinations were made of the precipitated alumina. The final products, after filtration, washing, and drying were analyzed for silica, alumina, and ignition loss, and in a few cases, for ferric oxide and soda. Analyses for silica were always made on samples which were large enough to contain 5 to 10 g. of $Al_2O_3$.

Extractions were made both on a laboratory and small pilot plant scale. The solid residues from the pilot plant extractions were dried, analyzed, and further treated to recover the alumina and soda which they contained. This treatment consisted in mixing the residues with calcium carbonate, heating to suitable temperatures, and extracting the ground product, with water, sodium hydroxide solution, or sodium chloride solution.

Studies were made of the composition and structures, as revealed by X-rays, of the solid residues remaining after extraction of the bauxites with sodium hydroxide solution alone and when the various sodium salts were present. Synthetic preparations consisting of complex compounds of sodium aluminum silicate and the various sodium salts were also investigated and compared with the residues from the extractions of the bauxites.

To determine the molar ratios of $Na_2O$ (as NaOH) to $Al_2O_3$ in the bauxites that would give satisfactory recoveries of $Al_2O_3$, a number of extractions of the three bauxites were made at boiling temperatures. The volume of the extracting solution was 200 ml. in all experiments. The quantities of bauxites used and the compositions of the solutions before and after extraction are given in Table 2.

Table 2.—*Determination of optimum molar ratios of $Na_2O$ as $NaOH$ to $Al_2O_3$ in bauxites*

| Extraction No. | Bauxite, grams/liter | | Initial Solution | | | Final Solution Composition, grams/liter | | | $Al_2O_3$ Recovered, % |
|---|---|---|---|---|---|---|---|---|---|
| | Kind | Amt. | Composition, grams/liter | | M. Ratio $Na_2O$ as $NaOH/Al_2O_3$ in bauxite | | | | |
| | | | $Na_2CO_3$ | NaOH | | $Na_2CO_3$ | NaOH | $Al_2O_3$ | |
| 1 | A | 289 | 300 | 100 | 1.0 | 256.5 | 84.5 | 39.3 | 31 |
| 2 | A | 241 | 300 | 100 | 1.5 | 263.0 | 94.5 | 47.3 | 44 |
| 3 | A | 144 | 300 | 100 | 2.0 | 278.0 | 88.5 | 39.9 | 63 |
| 4 | A | 96.5 | 300 | 100 | 3.0 | 286.8 | 88.8 | 26.8 | 63 |
| 5 | B | 252.5 | 300 | 100 | 1.0 | 259.5 | 86.5 | 52.7 | 41 |
| 6 | B | 168 | 300 | 100 | 1.5 | 278.0 | 77.0 | 55.8 | 66 |
| 7 | B | 126 | 300 | 100 | 2.0 | 278.0 | 88.5 | 42.3 | 66 |
| 8 | B | 84 | 300 | 100 | 3.0 | 267.5 | 94.5 | 28.9 | 68 |
| 9 | C | 284 | 250 | 125 | 1.0 | 231.5 | 114.0 | 64.1 | 40 |
| 10 | C | 189.5 | 250 | 125 | 1.5 | 221.0 | 121.5 | 81.3 | 76 |
| 11 | C | 142 | 250 | 125 | 2.0 | 234.0 | 117.0 | 61.1 | 77 |
| 12 | C | 94.5 | 250 | 125 | 3.0 | 229.5 | 120.5 | 41.8 | 79 |

The amounts of sodium carbonate and sodium hydroxide employed were such that the solutions were maintained at, or near, saturation with respect to sodium carbonate at boiling temperatures. By adding various quantities of the bauxites, the molar ratios of $Na_2O$ (as NaOH) in the initial solutions to $Al_2O_3$ in the bauxites were varied between 1 and 3.

At the end of a boiling period of 3 hours the mixtures were filtered and the residues washed with about 100 ml. of hot water. The combined extracts and washings were then made up to 500 ml. in a volumetric flask and the solutions analyzed for $Al_2O_3$, $Na_2CO_3$, and NaOH. The results are expressed on the basis of the original volume of solution, and the recovery of alumina is calculated as the percentage of $Al_2O_3$, in the bauxite, which was found in the solution.

The relationships between the percentages of $Al_2O_3$ dissolved from the bauxites and the molar ratios of $$\frac{Na_2O \text{ as NaOH in the initial solution}}{Al_2O_3 \text{ in the bauxite}}$$

are shown in Figure 1. This graph shows that ratios varying between 1.5 and 2, depending on the individual bauxite, will secure the optimum extraction of $Al_2O_3$ at boiling temperatures.

It should be noted that the concentrations of both $Na_2CO_3$ and NaOH remaining in solution after extraction were less than those initially present. This means that the residue must contain carbonate as well as $Na_2O$ derived from both NaOH and $Na_2CO_3$. This discovery was confirmed by analyses and further examination of the residues, the results of which will be considered in a later section.

In preliminary work it was discovered that the amount of silica contained in the sodium aluminate extracts from the bauxites was depressed by the presence of sodium carbonate. Further research revealed that other sodium salts gave the same effect to a more marked degree. To secure quantitative data on the magnitude of this effect a considerable number of laboratory-scale extractions of the bauxites were made, both at boiling temperatures and at 150° C., with a solution containing 125 g. of NaOH per liter and various added salts in the amounts given in Table 3. The actual volume of the solutions used in the experiments was 400 ml. and the quantity of bauxite was such that the molar ratio of $Na_2O$ (as NaOH) in the initial solutions to $Al_2O_3$ in the bauxites was 2.0. The residues remaining after extraction were washed with 200 ml. of hot water and the combined extracts and washings were analyzed for alumina and silica. However, the results were calculated on the basis of the original volume of the extracting solution (400 ml.) but, for purposes of comparison with data in other tables, are reported in Table 3 in terms of grams per liter.

Table 3.—*Laboratory extractions of bauxites with sodium hydroxide and salt solutions*

| Extraction No. | Bauxite used, g./l. | | Salt Added g./l. | | Temp. in degrees Cent. | g. per l. in Solution of— | | Recovery of $Al_2O_3$, Percent | Ratio $SiO_2$ to $Al_2O_3$, Percent |
|---|---|---|---|---|---|---|---|---|---|
| | Kind | Amt. | Kind | Amt. | | $Al_2O_3$ | $SiO_2$ | | |
| 1 | A | 180 | None | | Boiling | 50.2 | 0.228 | 63.2 | 0.45 |
| 2 | A | 180 | $Na_2CO_3$ | 125 | do | 42.1 | 0.102 | 53.0 | 0.21 |
| 3 | A | 180 | do | 250 | do | 48.6 | 0.089 | 61.1 | 0.18 |
| 4 | A | 180 | do | 375 | do | 48.0 | 0.075 | 60.3 | 0.16 |
| 5 | A | 180 | None | | 150 | 48.8 | 0.172 | 61.5 | 0.35 |
| 6 | A | 180 | $Na_2CO_3$ | 250 | 150 | 50.1 | 0.056 | 63.1 | 0.12 |
| 7 | A | 180 | $Na_2SO_4$ | 125 | Boiling | 49.1 | 0.093 | 61.7 | 0.19 |
| 8 | A | 180 | do | 250 | do | 50.5 | 0.101 | 63.5 | 0.20 |
| 9 | A | 180 | do | 375 | do | 48.2 | 0.080 | 60.6 | 0.17 |
| 10 | A | 180 | do | 250 | 150 | 50.2 | 0.046 | 63.2 | 0.09 |
| 11 | A | 180 | NaBr | 125 | Boiling | 49.4 | 0.140 | 62.2 | 0.28 |
| 12 | A | 180 | do | 250 | do | 45.6 | 0.078 | 57.4 | 0.17 |
| 13 | A | 180 | do | 375 | do | 48.3 | 0.061 | 60.8 | 0.13 |
| 14 | A | 180 | do | 500 | do | 49.8 | 0.025 | 62.7 | 0.05 |
| 15 | A | 180 | do | 250 | 150 | 50.2 | 0.046 | 63.2 | 0.09 |
| 16 | A | 180 | NaCl | 125 | Boiling | 46.4 | 0.085 | 58.4 | 0.19 |
| 17 | A | 180 | do | 250 | do | 47.2 | 0.048 | 59.3 | 0.10 |
| 18 | A | 180 | do | 375 | do | 47.5 | 0.031 | 59.7 | 0.07 |
| 19 | A | 180 | do | 500 | do | 46.3 | 0.028 | 58.2 | 0.06 |
| 20 | A | 180 | do | 125 | 150 | 43.9 | 0.054 | 55.3 | 0.12 |

*Table 3.—Laboratory extractions of bauxites with sodium hydroxide and salt solutions—continued*

| Extraction No. | Bauxite used, g./l. Kind | Bauxite used, g./l. Amt. | Salt Added g./l. Kind | Salt Added g./l. Amt. | Temp. in degrees Cent. | g. per l. in Solution of— Al₂O₃ | g. per l. in Solution of— SiO₂ | Recovery of Al₂O₃, Percent | Ratio SiO₂ to Al₂O₃, Percent |
|---|---|---|---|---|---|---|---|---|---|
| 21 | A | 180 | ..do...... | 250 | 150...... | 37.5 | 0.017 | 43.5 | 0.05 |
| 22 | A | 180 | ..do...... | 375 | 150...... | 50.1 | 0.016 | 63.1 | 0.03 |
| 23 | A | 180 | NaNO₃... | 125 | Boiling | 49.1 | 0.048 | 62.0 | 0.10 |
| 24 | A | 180 | ..do | 250 | ..do | 48.7 | 0.010 | 61.5 | 0.02 |
| 25 | A | 180 | ..do...... | 375 | ..do...... | 48.4 | 0.013 | 61.1 | 0.03 |
| 26 | A | 180 | ..do...... | 125 | 150...... | 46.2 | 0.036 | 58.2 | 0.08 |
| 27 | A | 180 | ..do...... | 250 | 150...... | 49.4 | 0.009 | 62.2 | 0.02 |
| 28 | A | 180 | ..do...... | 375 | 150...... | 42.6 | 0.008 | 53.7 | 0.02 |
| 29 | B | 157.5 | ---------- | None | Boiling | 54.0 | 0.324 | 67.9 | 0.60 |
| 30 | B | 157.5 | Na₂CO₃... | 62.5 | ..do...... | 53.7 | 0.177 | 67.5 | 0.33 |
| 31 | B | 157.5 | ..do | 125 | ..do | 52.5 | 0.147 | 66.0 | 0.28 |
| 32 | B | 157.5 | ..do...... | 250 | ..do...... | 55.5 | 0.130 | 69.8 | 0.24 |
| 33 | B | 157.5 | ..do...... | 312.5 | ..do...... | 53.7 | 0.129 | 67.5 | 0.24 |
| 34 | B | 157.5 | ---------- | None | 150...... | 51.6 | 0.146 | 64.9 | 0.28 |
| 35 | B | 157.5 | Na₂CO₃ | 250 | 150...... | 53.1 | 0.074 | 66.8 | 0.14 |
| 36 | B | 157.5 | Na₂SO₄... | 125 | Boiling | 53.6 | 0.108 | 67.5 | 0.20 |
| 37 | B | 157.5 | ..do...... | 250 | ..do...... | 52.7 | 0.102 | 66.2 | 0.19 |
| 38 | B | 157.5 | ..do...... | 375 | ..do...... | 49.4 | 0.080 | 62.0 | 0.16 |
| 39 | B | 157.5 | ..do...... | 500 | ..do...... | 53.8 | 0.071 | 67.8 | 0.13 |
| 40 | B | 157.5 | ..do...... | 250 | 150...... | 53.0 | 0.053 | 66.7 | 0.10 |
| 41 | B | 157.5 | NaBr...... | 375 | Boiling | 47.7 | 0.076 | 60.0 | 0.16 |
| 42 | B | 157.5 | NaCl...... | 125 | ..do...... | 51.3 | 0.169 | 64.5 | 0.33 |
| 43 | B | 157.5 | ..do...... | 250 | ..do...... | 51.2 | 0.113 | 64.4 | 0.22 |
| 44 | B | 157.5 | ..do...... | 375 | ..do...... | 50.4 | 0.071 | 63.4 | 0.14 |
| 45 | B | 157.5 | ..do...... | 500 | ..do...... | 50.5 | 0.056 | 63.5 | 0.11 |
| 46 | B | 157.5 | ..do...... | 250 | 150...... | 48.2 | 0.021 | 60.6 | 0.04 |
| 47 | B | 157.5 | NaNO₃... | 375 | Boiling | 47.1 | 0.057 | 59.3 | 0.12 |
| 48 | B | 157.5 | ..do...... | 250 | 150...... | 51.8 | 0.018 | 65.2 | 0.03 |
| 49 | C | 142 | ---------- | None | Boiling | 61.8 | 0.340 | 77.4 | 0.55 |
| 50 | C | 142 | Na₂CO₃... | 62.5 | ..do...... | 61.3 | 0.245 | 76.8 | 0.41 |
| 51 | C | 142 | ..do...... | 125 | ..do...... | 61.4 | 0.233 | 77.0 | 0.38 |
| 52 | C | 142 | ..do...... | 250 | ..do...... | 61.8 | 0.212 | 77.4 | 0.34 |
| 53 | C | 142 | ..do...... | 250 | 150...... | 60.6 | 0.088 | 75.9 | 0.14 |
| 54 | C | 142 | NaCl...... | 125 | Boiling | 59.2 | 0.102 | 74.4 | 0.17 |
| 55 | C | 142 | ..do...... | 250 | ..do...... | 56.8 | 0.069 | 71.5 | 0.12 |
| 56 | C | 142 | ..do...... | 375 | ..do...... | 52.6 | 0.032 | 66.2 | 0.06 |
| 57 | C | 142 | ..do...... | 250 | 150...... | 56.0 | 0.024 | 70.2 | 0.04 |

Table 3 shows that the order of increasing effectiveness of the salts, in depressing the concentration of silica in the extracts, is as follows: $Na_2CO_3$, $Na_2SO_4$, NaBr, NaCl, $NaNO_3$. Generally the amounts of silica found in the 150° C. extracts are considerably lower than those obtained at boiling, but for bauxite A, in the presence of $NaNO_3$, boiling appears to be almost as effective as treatment at 150° C. The purity of the alumina in solution with respect to silica in the presence of the various salts is more clearly shown in Figures 2 to 7.

A slight decrease in the recovery of alumina, as the concentration of added salt is increased, is noticeable in Table 3.

In a number of extractions, particularly those carried out in the autoclave where good agitation could not be maintained, low recoveries were sometimes caused by caking of the bauxite during extraction.

A number of extractions of the three bauxites were made in a small pilot plant. The quantities of materials used and data obtained in some representative extractions are given in Table 4.

*Table 4.—Pilot plant extractions of bauxites*

| Extraction No. | | 1 | 2 | 3 | 4 | 5 | 6 |
|---|---|---|---|---|---|---|---|
| Bauxite used | Kind | A | C | C | B | B | B |
| | lbs. | 20.0 | 17.25 | 17.25 | 15.8 | 15.8 | 12.6 |
| Salt Added | Kind | Na₂CO₃ | Na₂CO₃ | Na₂CO₃ | NaCl | NaCl | NaNO₃ |
| | lbs. | 27.8 | 30.0 | 30.0 | 25.0 | 37.5 | 20.0 |
| NaOH Added, lbs. | | 13.9 | 15.0 | 15.0 | 12.5 | 12.5 | 10.0 |
| Gallons of initial solution | | 13.1 | 13.2 | 14.0 | 11.0 | 10.9 | 9.0 |
| Gallons of Extract and wash | | 32.9 | 29.4 | 36.4 | 23.5 | 21.4 | 30.3 |
| Composition of Extract and Wash (g./l.) | Na₂CO₃ | 77.5 | 105.4 | 81.3 | | | |
| | NaOH | 39.2 | 56.0 | 43.8 | | | |
| | Al₂O₃ | 18.6 | 29.8 | 22.6 | 24.5 | 26.7 | 14.2 |
| | SiO₂ | 0.046 | 0.089 | 0.072 | 0.034 | 0.024 | 0.013 |
| Recoveries of (per cent) | Na₂CO₃ | 75 | 86 | 82 | | | |
| | NaOH | 77 | 92 | 89 | | | |
| | Al₂O₃ | 58 | 75 | 71 | 60 | 60 | 63 |
| Ratio of SiO₂ to Al₂O₃ in solution, per cent | | 0.25 | 0.30 | 0.32 | 0.14 | 0.09 | 0.09 |

The solution containing sodium hydroxide and dissolved salt was heated to boiling in a 30 gallon digester provided with a heat-insulating jacket, and the bauxite then added, after which the mixtures were heated for 3 hours by passing steam into the digester. Condensation of steam during the extraction increased the volume of the solution somewhat. Continuous agitation was maintained by means of a mechanical stirrer. Extractions 1, 2, and 3 of Table 4 were made at atmospheric pressure and, extractions 4, 5, and 6 at approximately 30 lbs. gauge pressure (135° C.). At the end of the heating period the mixture was filtered. The filter cake was then washed with hot water and the volume of the extract plus the wash water was measured. Analyses of the resulting solutions were made for $Na_2CO_3$, NaOH, $Al_2O_3$, and $SiO_2$. The figures given in Table 4, for recoveries of $Na_2CO_3$, NaOH, and $Al_2O_3$, are based on the amounts of these materials found in solution. The proportions of $SiO_2$ to $Al_2O_3$ in the solutions, in percent, are plotted for bauxite B in Figure 3, where the values are designated as "Large Scale." It will be noted that the values are comparable to those obtained in the laboratory-scale extractions. The percentage recoveries of alumina were slightly lower in the pilot-plant than in the laboratory extractions because of less favorable operating conditions.

Complete, or almost complete, precipitation of the alumina in the pilot-plant extracts was effected by means of carbon dioxide that was passed slowly into the solutions which were heated to boiling and kept in continuous agitation with steam.

The precipitated material was filtered, washed with hot water and dried overnight at 130° C.

Microscopical examination showed that the preparations consisted of well-developed prismatic crystals having the refractive indices of gibbsite.

Chemical analyses of the gibbsite preparations obtained from the extracts listed in Table 4 showed that their ratios of silica to alumina were almost identical with those of the original solutions.

The possibility of securing a differential precipitation of alumina and silica by controlling the pH of the solution was investigated. For this purpose an additional pilot plant extraction was made. After heating the solution to boiling with steam, $CO_2$ was passed in at a slow rate. Samples of the precipitated alumina and of the solution were withdrawn at intervals and analyzed for $Al_2O_3$ and $SiO_2$, as well as for measurement of the pH of the solution with a hydrogen electrode. The results are given in Table 5.

greatest in the early stages of the precipitation. As this differential precipitation continues the ratio of silica to alumina in solution increases to a greater extent than that in the precipitate. However, if the precipitation of alumina is carried to completion, practically all of the silica remaining in solution is brought down also. Hence it is advantageous to avoid the precipitation of the last fraction of the alumina.

Chemical analyses of the residues from pilot plant extractions of the three bauxites with sodium carbonate-sodium hydroxide solutions are given in Table 6. The molar ratios of the residues, except for those from bauxite C, are close to the proportions $1.0Na_2O:1.0Al_2O_3:2SiO_2$.

Table 6.—Compositions of residues from pilot plant extractions of bauxites

| Extraction No. | Bauxite designation | Oxide Composition (ignition-free basis), percent | | | | | Molar Ratios | | |
|---|---|---|---|---|---|---|---|---|---|
| | | $Na_2O$ | $Al_2O_3$ | $SiO_2$ | $Fe_2O_3$ $+TiO_2$ | CaO | $Na_2O$ | $Al_2O_3$ | $SiO_2$ |
| 1 | A | 14.77 | 29.16 | 31.69 | 18.51 | ¹5.29 | 0.8 | 1.0 | 1.8 |
| 2 | A | 16.41 | 29.97 | 33.94 | 19.26 | 0.39 | 0.9 | 1.0 | 1.9 |
| 3 | A | 16.32 | 29.96 | 34.00 | 19.04 | 0.25 | 0.9 | 1.0 | 1.9 |
| 4 | B | 23.62 | 32.36 | 36.04 | 7.98 | | 1.15 | 1.0 | 1.9 |
| 5 | B | 21.55 | 34.40 | 35.74 | 6.52 | ¹1.98 | 1.0 | 1.0 | 1.8 |
| 6 | C | 16.45 | 38.38 | 28.04 | 7.81 | ¹9.19 | 0.7 | 1.0 | 1.2 |
| 7 | C | 15.62 | 38.11 | 31.58 | 9.77 | ¹4.82 | 0.7 | 1.0 | 1.4 |

¹ CaO derived principally from $CaCO_3$ added as filter aid.

In four instances (extractions 2 and 3 with bauxite A and extractions 6 and 7 with bauxite C) the residues were first dried at 110° C. and the $CO_2$ content of each sample and its loss-on-ignition at 950° C. were then determined. The content of $H_2O$ was taken as the difference between the $CO_2$ combined with the CaO ($CaCO_3$ added as a filter aid), the $Na_2O$ required to combine with the remaining $CO_2$ as $Na_2CO_3$ was calculated and this value of $Na_2O$ was subtracted from the total of $Na_2O$. The following molar ratios were obtained.

| Extraction No. of Table 6 | Molar ratios | | | | |
|---|---|---|---|---|---|
| | $Na_2O$ | $Al_2O_3$ | $SiO_2$ | $Na_2CO_3$ | $H_2O$ |
| 2 | 0.8 | 1.0 | 1.9 | 0.13 | 1.8 |
| 3 | 0.8 | 1.0 | 1.9 | 0.14 | 1.5 |
| 6 | 0.6 | 1.0 | 1.2 | 0.07 | 1.3 |
| 7 | 0.6 | 1.0 | 1.2 | 0.06 | 1.2 |

Numerous calculations based on the alumina and silica contents of the residues from laboratory-scale extractions and the losses in soda occurring during these extractions likewise in- Table 5.—Precipitation of alumina from extract of bauxite A

| Composition of Solution | | | pH of Solution | Ratio of $SiO_2$ to $Al_2O_3$ in Precipitated $Al_2O_3$, Per Cent | Remarks |
|---|---|---|---|---|---|
| $Al_2O_3$ g./l. | $SiO_2$ g./l. | $\frac{SiO_2}{Al_2O_3}\%$ | | | |
| 12.8 | 0.0428 | 0.33 | 13.04 | | (¹) |
| 11.1 | 0.0398 | 0.36 | 12.20 | | (²) |
| 9.1 | 0.0338 | 0.37 | 11.63 | 0.18 | (³) |
| 7.3 | 0.0285 | 0.39 | 12.40 | 0.21 | (⁴) |
| 1.9 | 0.0125 | 0.68 | 11.64 | 0.24 | (⁵) |

¹ Solution at start.
² After passing in $CO_2$ to effect slight precipitation.
³ After passing in $CO_2$ to effect partial precipitation.
⁴ $CO_2$ addition stopped but alumina precipitation continued overnight.
⁵ After passing in $CO_2$ to precipitate most of alumina.

The data in Table 5 show that the purity of the precipitated alumina with respect to silica is dicated approximately the same $Na_2O:Al_2O_3:SiO_2$ molar ratios. The residues must also contain carbonate which disappears from solution during the extractions.

Accordingly, steps were taken to synthesize a sodium aluminum silicate carbonate compound of a composition similar to that of the residues. The following mixtures of gibbsite and silica gel were boiled with solutions of $Na_2CO_3$ and NaOH similar to those used in extracting the alumina from the bauxites.

|  | Mixture #1 | Mixture #2 |
|---|---|---|
| $H_2O$, ml | 400 | 400 |
| $Na_2CO_3$, g | 100 | 100 |
| NaOH, g | 50 | 50 |
| $Al_2O_3.3H_2O$, g | 13 | 26 |
| Silica gel, g | 11.4 | 11.4 |

The mixtures were filtered and the residues washed and dried to constant weight at room temperature. Their compositions were as follows:

|  | Percent | Percent |
|---|---|---|
| $Na_2O$ | 20.3 | 20.9 |
| $Al_2O_3$ | 29.8 | 31.2 |
| $SiO_2$ | 35.1 | 33.5 |
| $H_2O$ | 12.7 | 13.8 |
| $CO_2$ | 1.8 | 1.1 |
| $Fe_2O_3$ | 0.1 | 0.0 |
|  | 99.8 | 100.5 |

The $Na_2O:Al_2O_3:SiO_2:Na_2CO_3:H_2O$ molecular ratios are 0.98:1.00:2.00:0.14:2.42 and 1.02:1.00:1.82:0.09:2.50 for samples 1 and 2, respectively.

An X-ray diffraction pattern of sample 1 showed that it had a structure similar to that of the mineral sodalite, $Na_2O.Al_2O_3.2SiO_2.\frac{2}{3}NaCl$ $(3Na_2O.3Al_2O_3.6SiO_2.2NaCl)$ In order to determine whether or not a sodium aluminium silicate compound of similar composition but containing no sodium carbonate, would also have an X-ray diffraction pattern similar to that of sodalite, the preparation of such a compound was attempted. In this experiment a mixture of 20 g. of $SiO_2$, in the form of silica gel, and 39 g. of gibbsite was heated in an autoclave with 600 ml. of solution containing 90 g. of NaOH at 150° C. for 5 days. The resulting product was filtered from the solution, washed with hot water and dried in air. It had a composition represented by the molar ratios $1:17Na_2O:1.00Al_2O_3:1.96SiO_2:2.1H_2O$. This material had an X-ray diffraction pattern which was distinctly different from that of the preparation containing sodium carbonate.

These investigations indicate that the decreased concentrations of silica obtained in sodium aluminate solutions in the presence of sodium carbonate are probably caused by the formation of a compound similar to sodalite and having a lower solubility than that of the hydrated sodium aluminum silicate formed in the absence of sodium carbonate. They raised the question also as to whether other sodium salts might form compounds of a type similar to sodalite, but afforded no basis for predicting whether such salt formed compounds would have desirably low solubilities, there being no known data on the solubility of such compounds under the conditions here dealt with. Hence sodium chloride, sodium bromide, sodium nitrate, and sodium sulfate were substituted for sodium carbonate in the extractions summarized in Table 3 and Figures 2 to 7. As noted above, the results showed that lower concentrations of silica were obtained in the presence of these salts.

Preparations of the compounds containing sodium chloride, sodium bromide, sodium nitrate, and sodium sulfate were made in the autoclave at 150° C. The X-ray diffraction pattern of the double salt of sodium aluminum silicate with sodium chloride was identical with the pattern given by the mineral sodalite. The pattern of the bromide compound was almost identical with, and that of the nitrate compound very similar to, that of sodalite. As already stated the double salt with sodium carbonate also has a pattern similar to that of sodalite. However, the double salt with sodium sulfate has a pattern which differs from that of sodalite and also from that of the preparation of sodium aluminum silicate containing no added salt.

There are four minerals which mineralogists have recognized as belonging to the sodalite group. These, according to N. H. and A. N. Winchell, "Elements of Optical Mineralogy," pt. 2, 3rd ed., John Wiley & Sons, N. Y. (1931), are the following:

Sodalite $3Na_2O.3Al_2O_3.6SiO_2.2NaCl$
(i. e. $Na_2O.Al_2O_3.2SiO_2.\frac{2}{3}NaCl$)
Noselite $3Na_2O.3Al_2O_3.6SiO_2.Na_2SO_4$
(i. e. $Na_2O.Al_2O_3.2SiO_2.\frac{1}{3}Na_2SO_4$)
Hauynite $3Na_2O.3Al_2O_3.6SiO_2.2CaSO_4$
(i. e. $Na_2O.Al_2O_3.2SiO_2.\frac{2}{3}CaSO_4$)
Lazurite $3Na_2O.3Al_2O_3.6SiO_2.2Na_2S$
(i. e. $Na_2O.Al_2O_3.2SiO_2.\frac{2}{3}Na_2S$)

Naturally-occurring minerals, corresponding to the carbonate, nitrate, and bromide double salts, are as yet unknown. It appears probable, however, that a considerable number of double salts of the sodalite type are capable of existence, in which Cl may be replaced by a variety of acid radicals.

The preparations, on which the X-ray diffraction patterns had been obtained, were analyzed. The molar ratios, computed from the analyses, were as follows:

$1.2Na_2O:1.0Al_2O_3:2.0SiO_2:2.1H_2O$
$1.0Na_2O:1.0Al_2O_3:2.0SiO_2:0.1Na_2CO_3:2.4H_2O$
$0.9Na_2O:1.0Al_2O_3:1.9SiO_2:0.3Na_2SO_4:1.4H_2O$
$1.0Na_2O:1.0Al_2O_3:1.9SiO_2:0.5NaBr:0.8H_2O$
$1.0Na_2O:1.0Al_2O_3:2.0SiO_2:0.5NaCl:1.4H_2O$
$0.9Na_2O:1.0Al_2O_3:1.9SiO_2:0.4NaNO_3:0.9H_2O$

It will be noted that all of these preparations contain water of hydration and less sodium salt than corresponds to the reported compositions of the sodalite minerals. However, as mentioned previously, the X-ray diffraction patterns of the complex double salts, with the exception of the sulfate compound, were very similar to that of naturally occurring sodalite. This suggests the likelihood that a solid solution series between a hydrate and the respective sodalite type end member, is the actual mechanism producing the effect of, and herein termed, a sodalite-type compound.

A number of X-ray diffraction patterns were also made of the residues remaining after extraction of the bauxites with NaOH alone and with NaOH-salt solutions. In all cases these patterns indicated that the residues had the same structures as the corresponding synthetic double salts.

An analysis was made of the residue from a laboratory-scale extraction of bauxite B with a sodium hydroxide-sodium chloride solution. This residue had the following composition:

| | Per cent |
|---|---|
| $Na_2O$ | 22.46 |
| $Al_2O_3$ | 32.75 |
| $Fe_2O_3 + TiO_2$ | 5.80 |
| $SiO_2$ | 33.46 |
| Cl | 5.28 |
| | 99.75 |

The corresponding molar ratios are $0.90 Na_2O : 1.00 Al_2O_3 : 1.74 SiO_2 : 0.46 NaCl$

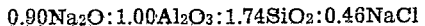

These ratios do not differ much from those found for the synthetic preparation which were as follows: $0.96 Na_2O : 1.00 Al_2O_3 : 1.97 SiO_2 : 0.53 NaCl$.

Summarizing the results of the X-ray and compositional investigation of the bauxite residues and of the synthetic double salts, it appears that the structures of the products containing sodium carbonate, sodium chloride, sodium bromide, and sodium nitrate are very similar to that of the mineral sodalite and that all may therefore be termed sodalitic or of sodalite type. The relationship to sodalite of the preparations containing sodium sulfate has not yet been definitely ascertained. These preparations may have the related structure of noselite. Additional X-ray studies of these compounds will be necessary to establish their structures more closely. Their formation is intended to be included, however, in the broader aspects of our invention.

A large number of experiments were performed to investigate the recovery of $Na_2O$ and $Al_2O_3$ from the residues left after extraction of the $Al_2O_3$ from the bauxites. As discussed in the previous section, these residues contained soda, alumina, and silica in molar ratios approximating 1:1:2. The residues were mixed with calculated quantities of calcium carbonate and burned at various temperatures between 1000° and 1400° C. The object of this treatment was to break down the insoluble sodium aluminum silicate complex by combining the silica as relatively inert dicalcium silicate, leaving the soda and alumina in the form of soluble sodium aluminate. After grinding the products they were extracted with water, solutions of sodium hydroxide, sodium carbonate, or sodium chloride, or with combinations thereof.

Most of the extractions were made on burns prepared from the residues of bauxites B and C. These bauxites contained only small amounts of $Fe_2O_3$ plus $TiO_2$, while bauxite A contained a relatively large amount. Because of uncertainty as to the state of combination of $Fe_2O_3$ and $TiO_2$ in the presence of $Na_2O$ and CaO, the addition of lime was calculated only on the basis of the silica present. It was determined that the $CaO/SiO_2$ molar ratio is rather critical and if the optimum value of 2.0, for bauxies B and C, was departed from the extraction of both $Al_2O_3$ and $Na_2O$ was sharply reduced. The optimum $CaO/SiO_2$ ratio for bauxite A was not determined.

The extractions were performed at temperatures between room temperature and boiling for times ranging from one minute to two hours. When the sinters having a $CaO/SiO_2$ molar ratio of 2.0 were extracted with water, up to 95 percent of the $Na_2O$ and 80 percent of the $Al_2O_3$ were extracted. The presence of large amounts of NaCl in the extracting solution reduced the recovery of $Al_2O_3$ by a few percent. Further reductions occurred as the sodium carbonate concentration of the solution increased, especially as it approached saturation.

Considerable $SiO_2$ was found in the extracts, sometimes amounting to 3 or 4 percent of the $Al_2O_3$ in solution. However, by boiling the solutions that contained suitable concentrations of NaCl (approximately 200 g. per liter) with seed charges of synthetic sodalite, the $SiO_2$ concentration could be reduced to a few hundredths of a percent of the $Al_2O_3$ concentration. This decrease in $SiO_2$ was accompanied by corresponding reductions in the $Na_2O$, $Al_2O_3$, and NaCl contents of the solutions as required by the resulting formation of additional sodalite.

An illustrative process for extracting alumina from low-grade bauxites, employing the discoveries and method described in the preceding sections, is set forth in the accompanying flow sheet (Figure 8). In this flow sheet no attempt has been made to portray all of the various possible modifications of the separate steps. Furthermore, the flow sheet has been simplified by excluding from consideration constituents of the bauxite such as $Fe_2O_3$ and $TiO_2$, which are effectively separated from the recovered alumina and are discarded in the residues. The $Al_2O_3$ and $SiO_2$ contents of the bauxite, given in the flow sheet, are approximately those of bauxite B.

The values given in the flow sheet for the quantities and compositions of the materials at various stages of the process are based both on laboratory-scale and small pilot-plant results.

As shown in the flow sheet the finely-ground bauxite is digested for a suitable time with a sodium hydroxide-sodium salt solution, either at the boiling temperature of the solution at atmospheric pressure or at a higher temperature and pressure. The use of this extracting mixture constitutes one of the novel features of the process. In the presence of sufficient concentrations of sodium salts the amounts of silica dissolved from bauxites by the extracting solutions are greatly depressed because of the formation of insoluble silicate compounds of the sodalite type. Various sodium salts may be employed in making up the extracting solution, such as the chloride, nitrate, sulfate, bromide, or carbonate. Sodium chloride is one of the most effective of the salts and, since it is cheap, its use is indicated in the flow sheet.

After completion of the heating period in the digester, the mixture is filtered and the residue washed with water very low in silica; indicated in the flow sheet as silica-free water. No attempt has been made in the flow sheet to specify the quantities of wash water to be used in various stages of the process since these quantities will vary with the scale of operation and may readily be determined by those skilled in the art. The residue is reserved for further treatment to recover most of the alumina and soda which it contains.

In our process the alumina may be removed from the combined extract and wash either by seeding with gibbsite, if the $Na_2O/Al_2O_3$ ratio is not too high, or by precipitation with carbon dioxide. The latter method is illustrated in the flow sheet where the kiln gas, after scrubbing, is shown as the source of carbon dioxide. By passing the kiln gas into the solution in the presence of a seed charge of gibbsite the major part of the alumina is precipitated when the sodium hydroxide in excess of sodium aluminate has been neutralized. The remainder of the alumina may be precipitated by continuing the slow addition of carbon dioxide. However, if the proportion of silica to alumina in the original extract was greater than 0.1 percent it may not be desirable to precipitate the alumina completely.

As shown in the flow sheet the residue from the initial extraction contains soda, alumina, silica, and sodium chloride in proportions approaching those of the mineral sodalite. It also contains the relatively inert constituents of the bauxite such as $Fe_2O_3$ and $TiO_2$. Finely ground calcium carbonate (limestone) is added to the residue to give a $CaO/SiO_2$ molar ratio of 2.0 and the mixture then heated to a suitable temperature to bring about clinkering or sintering. After grinding, it is extracted with the solution which remained after precipitation of the alumina in the first stage of the process. A small amount of lime is added to this solution to convert some of its sodium carbonate to sodium hydroxide. The temperature of extraction should probably not exceed 50° C. and the time required will vary with the character of the sinter.

On completion of the extraction the mixture is filtered and the residue washed and set aside. This residue with certain modifications can be used as a raw material for the manufacture of Portland cement. The solution, consisting of combined extract and washings, is then desilicized by boiling it with a seed charge of synthetic sodalite. This method of desilication by means of sodalite seed, constitutes a novel feature of the present process. The seed charge, together with the additional sodalite formed by desilication of the solution, is then filtered off and washed. A quantity of the sodalite corresponding to the original seed charge is used in subsequent desilications and the excess is treated, along with the next batch of residue, for recovery of alumina and soda which it contained.

Because of obvious advantages in the design of plant equipment for operation at atmospheric pressure over that required at elevated pressures, the desilications in our research were made, for the most part, in open containers. It should be pointed out, however, that desilication at elevated temperatures and pressures is the more effective as indicated by comparison of Figures 5 to 7 with Figures 2 to 4.

As in the first stage of the process, the alumina is precipitated from solution as gibbsite. The gibbsite is filtered from the solution, washed, and combined with the gibbsite obtained in the original extraction. Sodium carbonate is added to the remaining solution which is then concentrated by evaporation, causticized, and used for the extraction of more bauxite in the first stage of the process.

An outstanding advantage of this process, over other processes used heretofore, is that it is entirely independent of the use of high-grade bauxite at any stage of the extraction.

Referring more specifically to the embodiment exemplified in Figs. 9–14, for detailed understanding we will again consider the materials actually used and the procedures actually followed in our research.

The starting materials in these instances were a Georgia kaolin and a ground Indiana limestone of the following compositions:

|  | Kaolin, Per Cent | Limestone, Per Cent |
|---|---|---|
| $Al_2O_3$ | 37.23 | 0.12 |
| $SiO_2$ | 45.77 | 0.88 |
| $Fe_2O_3$ | 1.00 | 0.21 |
| $TiO_2$ | 1.12 |  |
| CaO |  | 54.98 |
| MgO |  | 0.35 |
| $Na_2O$ | 0.06 |  |
| Ignition Loss | 14.01 | 43.44 |
|  | 99.19 | 99.98 |

Technical or C. P. grades of sodium carbonate, sodium chloride, and sodium hydroxide were used in making up the extracting solutions.

A quantity of the ground kaolin, sufficient to contain 10 lb. of $Al_2O_3$, was mixed with the ground limestone in such amount that after allowing for the CaO and $Al_2O_3$ required to form $$4CaO.Al_2O_3.Fe_2O_3$$

and $2CaO.TiO_2$ with the $Fe_2O_3$ and $TiO_2$ present, the composition of the residue would lie on the join between $2CaO.SiO_2$ and $5CaO.3Al_2O_3$ in the ternary system $CaO$—$Al_2O_3$—$SiO_2$.

This material was burned at 1300°–1350° C. for 5 hours and allowed to cool slowly. Complete dusting of the product occurred. Its composition was as follows:

|  | Per cent |
|---|---|
| $Al_2O_3$ | 18.21 |
| $Fe_2O_3$ | 0.95 |
| $TiO_2$ | 0.32 |
| $SiO_2$ | 22.92 |
| CaO | 56.80 |
| MgO | 0.72 |
|  | 99.92 |

This material consisted largely of particles of 30–50 microns in diameter. Some experiments were made on the unground sinter and others on the material after it had been ground to an average particle size of 5 microns.

Extractions of the sinter were made with solutions containing sodium carbonate or mixtures of sodium carbonate and sodium chloride. The extracts that contained sodium chloride were desilicized in accordance with our invention by boiling them with seed charges of synthetic sodalite.

In the preparation of the synthetic sodalite it was found expedient to have an excess of alumina present in the original mixture. At the end of the heating period the excess alumina will remain in solution as sodium aluminate and the sodalite will contain silica and alumina in the theoretical molar ratio. Sodalite preparations containing silica in excess of the theoretical amount were found to be relatively ineffective in desilicizing the extracts. A good preparation of sodalite, we have discovered, can be used repeatedly without loss of efficacy in this example.

In addition to the extraction of the large-batch lime-kaolin sinter, a number of extractions were made on a small-batch sinter of the same composition. This was prepared by burning 100 g. quantities of the original mix in a muffle at 1100° C. until the product gave no test for free lime.

In order to ascertain yields and the purity of the extracted alumina with respect to silica, analyses of the extracts were made for $Al_2O_3$ and $SiO_2$ and, in some cases, for $Na_2O$ and NaCl. The results are expressed in terms of the volume of combined extract and wash.

The extractions listed in Table 7 were made on the small-batch sinter. The volume of the extracting solution was 400 ml. in all instances and the quantity of material extracted was such that the molar ratio of $Na_2CO_3$ in solution to $Al_2O_3$ in the sinter was 2.0. The mixtures were shaken for 2 hours at the temperatures given in Table 7, filtered, and the residues washed with 100 ml. of hot water. In most of the experiments the combined extracts and washings were then boiled for 2 hours with seed charges consisting of 5 g. of synthetic sodalite. After removal of the sodalite by filtration the solutions were analyzed for $Al_2O_3$, $SiO_2$, and $Na_2O$. The determinations of $SiO_2$ were made on samples large enough to contain 5–10 g. of $Al_2O_3$. A number of duplicate extractions were made in which the extracts were not desilicized. The results of analyses of these extracts are referred to in Table 7 as "Recoveries before desilicizing."

termined. Both 5 and 10 percent sodium carbonate solution were used, each containing 200 g. of NaCl per liter and the extraction temperature was 40° C. The quantities of material extracted were such that the molar ratio of $Na_2CO_3$ in solution to $Al_2O_3$ in the sinter was 2.0. The finely-ground portion of the large-batch kaolin-lime burn was used in this research.

As shown in Figure 9 the optimum extraction time appears to be about 1 hour. Longer periods gave much reduced extractions for the 10 percent $Na_2CO_3$ solution and slight reductions for the 5 percent solution.

The results of determinations which were made to establish the optimum molar ratio of $Na_2CO_3$ in solution to $Al_2O_3$ in the sinter, are shown in Figure 10. All of these solutions contained 200 g. of NaCl per liter and the extraction period was 1 hour at 40° C. Figure 10 shows that a molar

*Table 7.—Extractions of ground kaolin-lime sinter*

| Extraction No. | Composition of Extracting Solution | | Temp. of Extraction °C. | Recoveries | | | | | | | |
|---|---|---|---|---|---|---|---|---|---|---|---|
| | | | | Before Desilicizing | | | | After Desilicizing | | | |
| | | | | $Al_2O_3$ | | $Na_2O$, Per Cent | $SiO_2$, Per Cent | $Al_2O_3$ | | $Na_2O$, Per Cent | $SiO_2$, Per Cent |
| | $Na_2CO_3$, g./l. | NaCl g./l. | | g./l. | Per Cent | | | g./l. | Per Cent | | |
| 1 | 100 | 0 | 35 | 31.7 | 80 | -------- | 2.4 | -------- | -------- | -------- | ------ |
| 2 | 100 | 160 | 35 | 28.6 | 72 | -------- | 3.8 | -------- | -------- | -------- | 0.24 |
| 3 | 50 | 0 | 50 | 15.8 | 81 | -------- | 2.6 | 14.6 | 76 | -------- | 0.16 |
| 4 | 50 | 40 | 50 | -------- | -------- | -------- | -------- | 14.6 | 76 | 98 | 0.10 |
| 5 | 50 | 80 | 50 | 15.0 | 78 | -------- | 1.9 | 14.8 | 77 | 98 | 0.10 |
| 6 | 50 | 120 | 50 | -------- | -------- | -------- | -------- | 14.2 | 74 | 97 | 0.05 |
| 7 | 50 | 160 | 50 | -------- | -------- | -------- | -------- | 13.3 | 69 | -------- | 0.27 |
| 8 | 100 | 0 | 50 | 31.8 | 80 | -------- | 2.4 | 30.4 | 79 | 98 | 0.10 |
| 9 | 100 | 160 | 50 | 27.3 | 71 | 98 | 2.0 | 26.9 | 70 | 97 | 0.09 |
| 10 | 100 | 240 | 50 | -------- | -------- | -------- | -------- | 25.0 | 65 | -------- | 0.16 |
| 11 | 100 | 160 | 85 | -------- | -------- | -------- | -------- | 10.3 | 26 | -------- | ------ |
| 12 | 50 | 0 | Boiling | 13.5 | 70 | -------- | 1.6 | -------- | -------- | -------- | 0.18 |
| 13 | 100 | 160 | Boiling | -------- | -------- | -------- | -------- | 9.5 | 24 | -------- | ------ |

It will be noted from Table 7 that the initial extracts contained $SiO_2$ in amounts corresponding to 1.6 to 3.8 percent of the weight of $Al_2O_3$ in solution. The sodalite desilication reduced these values to 0.05–0.27 percent.

In these extracts somewhat better extractions of $Al_2O_3$ were obtained with a 5 percent $Na_2CO_3$ solution than with a 10 percent solution. Greater differences were found later when the large-batch lime-kaolin sinter was extracted.

As shown in Table 7 the purity of the $Al_2O_3$ with respect to $SiO_2$, in the desilicized solutions, increased as the ratio of NaCl to $Na_2CO_3$ increased but this was accompanied by diminished recoveries of $Al_2O_3$. Although the data of Table 7 indicates that the losses of soda (as $Na_2CO_3+NaCl$) amounted to 2 to 3 percent of that present in the initial solution, it should be mentioned that these losses were calculated from the analyses of the solutions before and after extraction. Because of the small aliquots of solution which had to be taken, this method of analysis is not particularly sensitive. It was found later, by analysis of the residues remaining after extraction, that the losses of $Na_2O$ are actually much less than those reported in Table 7.

Satisfactory extractions of $Al_2O_3$ were obtained at both 35° and 50° C. but when the extractions were carried out at 85° C. and at boiling, with NaCl present, greatly diminished recoveries of $Al_2O_3$ resulted. Subsequent extractions, therefore, were made at 40–50° C.

In order to establish the optimum time of extraction the data illustrated in Figure 9 was deratio of $2.5Na_2CO_3/Al_2O_3$ gave the highest extractions. The reason for the decreased extractions obtained at a $3Na_2CO_3/Al_2O_3$ ratio is not known.

A number of analyses, of which the following is typical, were made of the solid residues from the above extractions:

| | Percent |
|---|---|
| $SiO_2$ | 22.54 |
| $Al_2O_3$ | 5.69 |
| $Fe_2O_3+TiO_2$ | 1.57 |
| CaO | 57.98 |
| $Na_2O$ | 0.45 |
| Cl | 0.05 |
| $CO_2$ | 11.24 |
| $H_2O$ | 0.60 |
| Total | 100.12 |

The quantity of $Na_2O$ contained in this residue represents 0.36 per cent of the total $Na_2O$ present in the extracting solution, which contained 50 g. of $Na_2CO_3$ and 200 g. of NaCl per liter. However, on the basis of the salts taken separately the loss of NaCl is but 0.05 percent, and that of $Na_2CO_3$ about 1.5 percent, of the amounts present originally. In the process this loss in sodium carbonate might be made up, wholly or in part, by the amount of alkali usually found in kaolin or clay.

Our discovery of the very small loss of sodium chloride during the extraction, as indicated by the above analysis, indicates that the use of sodium nitrate in the process is also feasible. Our research has disclosed that this salt appears to be even more effective than sodium chloride in bringing about desilication of the extracts.

The effect of the presence of excess NaOH on the extractions at 40° C. is shown in Figure 11. The compositions of the solutions used in these experiments were exactly the same as those described in the preceding paragraph except that they contained a quantity of added NaOH which corresponded to 10 percent of the weight of $Na_2CO_3$ in the initial solutions. Poorer extractions were obtained in all instances except in those where the molar ratio of $Na_2CO_3$ to $Al_2O_3$ was 3.0. It will be noted that no maxima were obtained in these extraction curves.

A pilot-plant extraction was made of the lime-kaolin sinter in order to prepare a considerable volume of solution which would be more or less typical of the extracts obtained when a 5 percent solution of $Na_2CO_3$ was used. This extraction was made on the unground material, before the most favorable conditions described in the preceding section had been worked out and the resulting solution was intended for desilication determinations only. A 15-lb bath of the sinter was treated in the digester at 45° C. for 2 hours with a solution containing 5.75 lbs. of NaOH and 9.2 lbs. of NaCl. The solution was separated from the residue by means of the filter press, and the residue thoroughly washed with warm water. A recovery of 61 percent of the $Al_2O_3$ was obtained and the $SiO_2/Al_2O_3$ ratio in solution was 1.03%. Use of the ground material and choice of the optimum time and composition of the extracting solution would have given a recovery of $Al_2O_3$ of about 80 percent. The combined extract and wash had the following composition in g. per l.: $Al_2O_3$, 14.2; $SiO_2$, 0.144; NaOH, 18.6; $Na_2CO_3$, 10.9; NaCl, 68.2; and its pH was 12.7. Half-liter portions of this extract, both with and without added sodium chloride, were boiled with seed charges of synthetic sodalite, the seed then removed by filtration, and the solutions analyzed. The results are summarized in Table 8.

*Table 8.—Desilication of pilot-plant extract of unground lime-kaolin sinter*

| Desilication No. | NaCl in Solution, g./l. | g./l. of Seed Added | Hours of Boiling | $SiO_2$ in Solution, g./l. | Ratio of $SiO_2$ to $Al_2O_3$, Per Cent | |
|---|---|---|---|---|---|---|
| | | | | | in Solution | in $Al_2O_3$ Precipitated |
| 1 | 68 | 0 | | 0.1440 | 1.03 | |
| 2 | 68 | 2 | 0.5 | 0.0442 | 0.32 | |
| 3 | 68 | 2 | 1 | 0.0376 | 0.27 | |
| 4 | 68 | 2 | 2 | 0.0238 | 0.17 | |
| 5 | 68 | 2 | 3 | 0.0238 | 0.17 | |
| 6 | 68 | 10 | 2 | 0.0110 | 0.08 | 0.10 |
| 7 | 114 | 10 | 2 | 0.0100 | 0.07 | 0.07 |
| 8 | 162 | 10 | 2 | 0.0049 | 0.035 | 0.05 |
| 9 | 204 | 10 | 2 | 0.0047 | 0.03 | 0.04 |
| 10 | 243 | 10 | 2 | 0.0024 | 0.02 | 0.02 |

When the quantity of seed added was 2 g. per liter the greatest lowering in $SiO_2$ concentration was obtained after 2 hours' boiling, as shown in desilications Nos. 2 to 5 of Table 8. This quantity of seed is insufficient, however, and, if the amount of sodalite added is increased to 10 g. per liter, the desilication proceeds further, as shown in No. 6, Table 8. Increases in the concentration of NaCl in solution also bring about decreases in the silica concentration (Nos. 7-10, Table 8). The decreases in $SiO_2$ associated with the $Al_2O_3$, both in solution and after complete precipitation from solution by means of $CO_2$ are shown in Figure 12. The point at zero concentration of NaCl is taken from extraction No. 3 of Table 7. From this figure it is apparent that addition to the carbonate solution of the salt $Na_xR'$ (the other salt of sodium capable of forming a sodalite-type compound with soda, alumina and silica) in any substantial amount relative to the weight of carbonate per liter in the solution, will effect significant decrease of the silica to alumina ratio of the desilicised solution. As the improved result is obtained in continuously greater degree with increase in the amount of $Na_xR'$ even a complete saturation of the solution with $Na_xR'$ may be employed, if desired, and the degree of saturation to be used in any given case will be determined by the point to which it is desired to reduce the silica to alumina ratio. For example, in the case shown in Fig. 12, for a 5% $Na_2CO_3$ solution (about 50 grams per liter), a reduction of the silica to well under 0.05% is effected with NaCl added to the solution in about four times that concentration (about 200 grams per liter). Thus those skilled in the art will appreciate that a substantial benefit is obtained and substantial use of our invention is made when the $Na_xR'$ is employed in the solution in substantial amount per liter compared to the amount of carbonate present in the solution.

In order to determine what effect the concentration of sodium hydroxide and the pH would have on the desilication of the extract a few desilications were made in which various amounts of sodium hydroxide were added to the solution. After measuring the pH of the resulting solutions, 500 ml. portions were boiled for 2 hours with 5 g. of sodalite, the sodalite removed by filtration, and the solutions analyzed for $Al_2O_3$ and $SiO_2$. The data, given in Table 9 and Figure 13, show that desilication becomes less efficient as the sodium hydroxide concentration increases. A decomposition of the sodalite seed, in the presence of the solutions containing the larger amounts of NaOH, is indicated by an increase in the $Al_2O_3$ concentration of the desilicized solutions from 14.2 to 14.5 g. per l.

*Table 9.—Effect of NaOH concentration on desilication of sodium aluminate solution (sodium chloride in solution—68.2 g. per liter)*

| Desilication No. | NaOH in Solution g/l | pH | Composition of Solution after Desilication | | |
|---|---|---|---|---|---|
| | | | Grams per liter | | Ratio of $SiO_2$ to $Al_2O_3$, Percent |
| | | | $Al_2O_3$ | $SiO_2$ | |
| 1 | 18.6 | 12.7 | 14.2 | 0.011 | 0.08 |
| 2 | 69 | 13.4 | 14.0 | 0.056 | 0.40 |
| 3 | 119 | 14.0 | 14.5 | 0.097 | 0.67 |
| 4 | 169 | 14.2 | 14.8 | 0.163 | 1.10 |
| 5 | 219 | 14.4 | 14.7 | 0.174 | 1.18 |

Some desilications were also made in which the pH and concentration of NaOH in the extracts were increased by adding $Ca(OH)_2$ to causticize the $Na_2CO_3$ present. These desilications were unsuccessful because this treatment caused the precipitation of a considerable part of the $Al_2O_3$, presumably as a hydrated calcium aluminate.

In other desilications the NaOH concentration and the pH were decreased by passing $CO_2$ into the solutions. Because of the low concentration of NaOH prevailing in the original extract it was difficult to obtain significant lowering in pH and still prevent the precipitation of part of the alumina. However, a trend of increased efficiency of desilication was indicated at the lower pH values.

An illustrative process for the extraction of alumina from kaolin or clay, employing the discoveries and methods described in the preceding sections, is set forth in the accompanying flow sheet (Figure 14). In this flow sheet also no attempt has been made to portray all the various possible modifications of the separate steps such as the use of other concentrations of the solutions or the use of other sodium salts than sodium chloride to depress the quantity of silica in solution but it will be understood that such modifications are contemplated by our invention. Furthermore, the constituents of the kaolin other than alumina and silica have been omitted since they are discarded in the residue. The alumina and silica content of the kaolin, given in the flow sheet, is approximately that of the kaolin referred to above. The values shown for quantities of material and composition of solutions are based on the results of both laboratory extractions and small scale pilot-plant extractions and would be somewhat changed if a kaolin or clay of different composition than that shown in the flow sheet were used, as will be understood by those skilled in the art.

The kaolin or clay, together with limestone, is ground and sintered in equipment such as that used in making Portland cement. Enough limestone is added to make the composition of the resulting material, calculated on an ignited basis, fall approximately on the line joining dicalcium silicate and pentacalcium trialuminate in the $CaO$—$Al_2O_3$—$SiO_2$ diagram. Allowance is made for the lime and alumina required for the formation of $2CaO.TiO_2$ and $4CaO.Al_2O_3.Fe_2O_3$ with any $TiO_2$ or $Fe_2O_3$ in the raw materials.

The sintered material is finely ground and then extracted at approximately 50° C. for a suitable time with sodium carbonate-sodium chloride solution. As above mentioned, the presence of the sodium chloride or other $Na_xR'$ reagent in this solution is caused by the fact that it, or some other sodium salt active in depressing the solubility of the sodium aluminum silicate complex, is required in a later stage of the process. A small reduction in the extraction of alumina is caused by the presence of the $Na_xR'$ (herein sodium chloride), which, however, cannot economically be avoided in a process recirculating the extracting solution.

After extraction of the alumina, the mixture is filtered and washed and the residue discarded or used as raw material for the manufacture of Portland cement.

The solution, including the washings, is next desilicized by the novel procedure upon which this process is based, namely the use of a sodium salt to precipitate the silica in solution in the form of an insoluble sodium aluminum silicate compound of the sodalite type. This procedure consists of boiling the solution with a seed charge of synthetic sodalite. The seed charge, together with the additional sodalite formed by the desilication of the solution is filtered off and washed. The sodalite in excess of that required for seed for the next batch is returned to the first stage of the process, allowance for its addition being made in calculation of the amount of limestone to be used in the subsequent batch. By this means the small amounts of alumina and soda in the excess sodalite are recovered.

Alumina is precipitated as gibbsite from the desilicized solution. In the flow sheet this precipitation is shown as caused by the carbon dioxide in the scrubbed gases from the kiln. The precipitated gibbsite, $Al_2O_3.3H_2O$, is filtered and washed with water low in silica. The solution and washings are used to scrub the flue gases from the kiln whereby evaporation of the excess water is caused and dust is removed from the gases. The evaporated and carbonated solution is returned to the extraction, together with enough sodium salt and sodium carbonate to make up the quantities of those materials discarded in the residue. The precipitated gibbsite is dried and calcined for electrolytic reduction to aluminum.

The alumina recovered from the process is shown as containing 0.06% of silica. However, this figure was used for illustration and does not constitute a limitation on the process. No difficulty has been experienced in reducing the silica to well below this figure merely by boiling the solution with sodalite seed in open containers in accordance with our invention.

Figure 3:
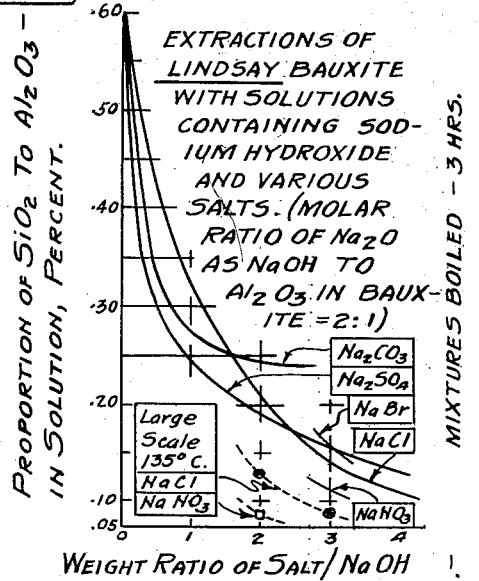
Figure 5:
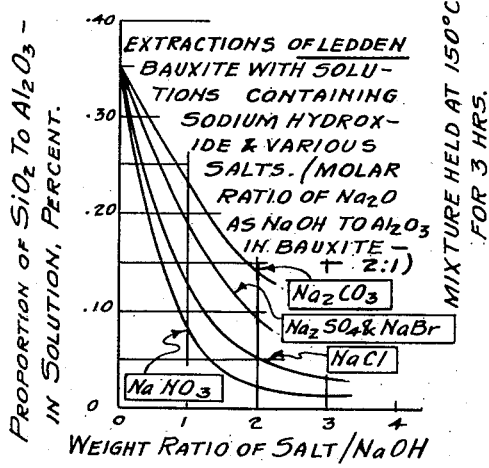
Figure 2:
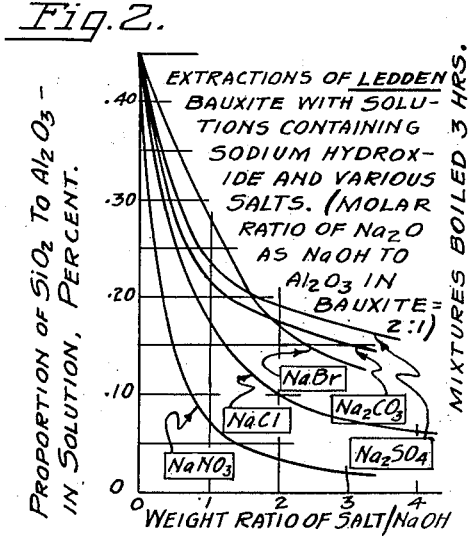
Figure 4:
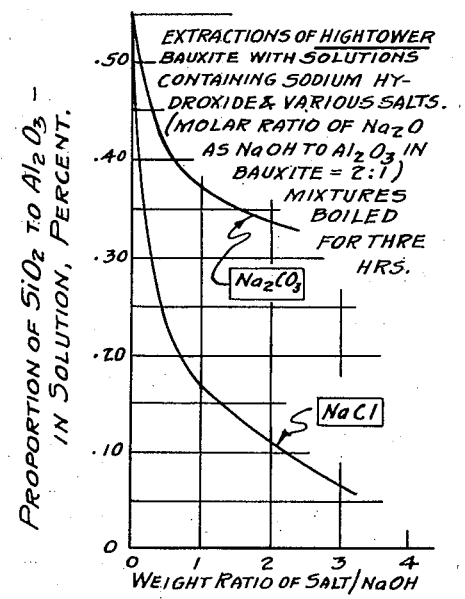

As pointed out in connection with the method of Fig. 3, the desilication at atmospheric pressure possesses obvious advantages in the design of plant equipment over that required for desilication at elevated temperatures and pressures. However, if more complete desilication is required than can be obtained at atmospheric pressure the desilication may be carried out in autoclaves at higher pressures.

The general process just described may likewise be applied to low-grade bauxites, as illustratedly exemplified in Fig. 15. Again for ease of reference, the materials actually used and procedure actually followed in our research are herein set forth.

Bauxite A, which has the composition given in Table 1, was selected for treatment. Other materials used included ground Indiana limestone and technical or C. P. grades, of sodium carbonate, sodium chloride, and sodium hydroxide.

The ground bauxite was mixed with ground limestone in such amount that, after allowing for the CaO and $Al_2O_3$ required to form $$4CaO.Al_2O_3.Fe_2O_3$$

and $2CaO.TiO_2$ with the $Fe_2O_3$ and $TiO_2$ present, the composition of the residue would lie on the join between $2CaO.SiO_2$ and $5CaO.3Al_2O_3$ in the ternary system $CaO$—$Al_2O_3$—$SiO_2$. The mixture, in 100 g. batches, was burned at 1290° C. for 1 hour and complete dusting of the product occurred on cooling. Its composition was as follows:

|  | Per cent |
|---|---|
| $Al_2O_3$ | 28.47 |
| $Fe_2O_3$ | 5.82 |
| $TiO_2$ | 1.24 |
| $SiO_2$ | 13.63 |
| CaO | 50.80 |
| Total | 99.96 |

Extractions of this material were made under conditions similar to those used in the extraction of the lime-kaolin sinter.

The results of some typical extractions of the bauxite-lime sinter at 50° C. for 2 hours are shown in Table 10.

Table 10.—Extractions at 50° C. of bauxite-lime sinter (84.6 g. of sinter per liter of extracting solution)

| Extraction No. | Composition of Extracting Solution | | | Molar ratio of $Na_2CO_3$ in solution to $Al_2O_3$ in sinter | $Al_2O_3$ recovered, Per Cent | Ratio of $SiO_2$ to $Al_2O_3$, Per Cent |
|---|---|---|---|---|---|---|
| | $Na_2CO_3$ g./l. | NaOH g./l. | NaCl g./l. | | | |
| 1 | 38 | 5 | 136 | 1.5 | 76 | 0.03 |
| 2 | 50 | 0 | 179 | 2.0 | 80 | 0.07 |
| 3 | 99 | 5 | 317 | 4.0 | 84 | 0.04 |
| 4 | 38 | 50 | 297 | 1.5 | 25 | 0.09 |

Extractions 1 to 3 show that the recovery of $Al_2O_3$ increased as the molar ratio of $Na_2CO_3$ in solution to $Al_2O_3$ in the sinter increased from 1.5 to 4.0. The recoveries of $Al_2O_3$ are high in spite of the relatively large concentrations of NaCl. The presence of small amounts of sodium hydroxide in the initial solutions appears to have little effect on the extractions but a concentration of 50 g. of NaOH per liter (extraction 4, Table 10) gave a greatly reduced recovery of $Al_2O_3$.

The extracts, which were boiled with sodalite according to the procedure heretofore described, were all effectively desilicized. However, the desilication was less complete in the case of extractions 2 and 4 than it was in extractions 1 and 3. In case 2 this is accounted for by the relatively low concentration of NaCl in the extract and in case 4 by the higher concentration of NaOH coupled with the lower concentration of $Al_2O_3$ resulting from a poor recovery.

An illustrative flow sheet of this embodiment of our process for the recovery of alumina from a low-grade bauxite is shown in Figure 15. Since the method parallels that used for kaolin, which has been discussed in considerable detail, the flow sheet for the recovery of alumina from this high-silica bauxite should be self-explanatory.

Although Figures 14 and 15 show the same percentage recovery of alumina from both the kaolin and bauxite, some of the data obtained in this study indicates that a high recovery is to be expected from bauxites. This, coupled with the fact that bauxites contain higher percentages of alumina than kaolin or clay, would make the use of bauxites in this process more advantageous. However, the larger amount of our research work was done on kaolin because of the widespread and abundant occurrence of clays, whereas the domestic supplies of even low-grade bauxites are limited. It may be advantageous to increase the yield in the process of Figs. 14 and 15 to regrind the sinter after it leaves the kiln as indicated in the sinter treatment in Fig. 8.

From the foregoing description those skilled in the art will perceive that our discovery may be applied to many alkaline processes for extracting alumina from clays and high-silica bauxites.

As above mentioned, our invention may be applied to the recovery of soda and alumina from the red mud of the ordinary Bayer process. In such application the process in general follows the treatment of the sinter in Fig. 8, with the chloride-carbonate tailings-solution (partially causticized or uncausticized) delivered directly to the extractor in lieu of the digester of Fig. 8, except that in this case the process builds up the $Na_2CO_3$ content of the solution, so that in lieu of the addition of make-up $Na_2CO_3$, a removal of excess $Na_2CO_3$ is provided, as by concentrating the solution sufficiently to precipitate the excess of $Na_2CO_3$, followed by sufficient dilution of the residual solution to condition it for reuse in the extraction step.

Similarly, our invention may be applied to improve the desilication in the soda-lime process of extracting alumina, following generally the procedure outlined in the treatment of the sinter in Fig. 8, with the tailings-solution (uncausticized or only partially causticized) returned directly to the extractor and with the soda (as soda ash, obtainable as aforesaid) added together with the calcium carbonate; or if desired the chloride-carbonate tailings-solution, uncausticized, or part of it, may be concentrated to a wet slurry and burned with the other materials in the kiln, the balance of the solution (uncausticized or partially causticized), or simply water, being added in the extractor.

Also, while our invention is not limited in its application to the lime-sinter processes, its application thereto yields an improved combination contemplated as one of the specific applications of an invention subordinate to our more generic discovery.

While, of course, we are not required to know or understand the theory of operation of our improvements, and while we are not to be bound by our hypotheses as to why our observed improvements are attained, we here set forth for completeness, what we believe to be the best explanation of the reasons for our improved results.

Based on the data obtained in our present research the most probable explanation of the effect of various salts in reducing the concentration of silica in sodium aluminate solutions appears to be that the amount of silica contained in such a solution is not a function of the solubility of silica as such but depends upon the solubility of the particular silicate, present as a solid phase, with which the solution is in equilibrium. If no solid phase is present the concentration of silica in solution is not fixed.

Our present research has discovered conditions under which the concentration of silica in solution may be fixed at low values by the formation of special types of silicates of low solubilities. We have discovered that formation of members of the sodalite group of minerals, or silicates of a similar type, accomplishes this desirable result. These sodalite type compounds appear to have the general formula $3Na_2O.3Al_2O_3.6SiO_2.qNa_xR$ where $q$ appears to approach 2, $x$ is the valence of the acid radical and R is an acid radical such as Cl, Br, $NO_3$, $SO_4$, $CO_3$, etc. Although the sodalite minerals are generally considered to be anhydrous, the compounds prepared in the course of our present research always contained some water of hydration and contained less sodium salt than corresponded to the reported composition of the natural minerals. However the X-ray diffraction patterns of all but the sulfate salt were very similar to that of naturally-occurring sodalite. This fact may indicate that our sodalite precipitates, herein called sodalite-type compounds, are members of a solid solution series between a hydrate and the respective sodalite type end member, considered as anhydrous. In any event, the sodalite characteristic is observed and with it, the decreased silica solubility.

Winchell has stated that the mineral sodalite will release sodium chloride to solution when treated with boiling water. This indicates that the mineral is incongruently soluble since its constituents do not dissolve in the same molar proportions as are present in the solid phase. The present investigation has resulted in the discovery that high concentrations in solution of the selected salt $Na_zR$ are required to stabilize the sodalite-type compounds and we have disclosed practical applications of this discovery. The increased stability of the compounds formed by employment of our invention is accompanied by a decrease in concentration of silica in the solutions with which they are in contact. On the other hand we have discovered that an increase in concentration of sodium hydroxide causes an increased dissociation of the sodalite-type compound with a resultant increase in the concentration of silica in solution. Therefore, the amount of silica remaining in solution was smallest when a low concentration of sodium hydroxide was accompanied by a high concentration of sodium chloride as in preferred examples of the practice of our method given above. As examples of the the very great effectiveness of the formation of sodalite in reducing the content of silica in alkaline solutions the following are noteworthy: Desilication of pilot-plant extract 10 (Table 8), which contained 243 of NaCl per liter, reduced the concentration of silica to 0.0024 g. per liter. In other words, this corresponds to 2.4 parts of $SiO_2$ per million parts of solution. More recently when about 7 gallons of this solution were desilicized there remained but 1.5 parts of $SiO_2$ per million parts of solution. The concentration of silica in these alkaline solutions is even less than that of the water supply of Washington, D. C., where the $SiO_2$ ranges from about 4 to 6 parts per million.

We have further discovered that the rate of formation of the sodalite-type compounds increases rapidly with temperature. In order to avoid the formation of sodalite during extraction of the lime-kaolin and lime-bauxite sinters, with consequent losses of alumina and soda, we apply this discovery by making our extractions of such sinters in the neighborhood of 50° C. or below, where the rate of sodalite formation is slow. The desilication of these extracts is likewise facilitated by our application of this discovery in that we carry out the desilication at boiling temperatures in the presence of sodalite seed and thus under conditions in which sodalite forms rapidly. For the same reason the initial extractions of the bauxites in the embodiment of Figure 8 are made at relatively high temperatures, as from boiling to, say 150° C. in order to secure a rapid and complete formation of sodalite and thereby obtain extracts low in silica. Likewise the extraction of the residue obtained in our Figure 8 embodiment is carried out at a relatively low temperature, about 50° C. or less, to avoid formation of sodalite, and again, desilication of the extract thus obtained is subsequently accomplished by raising the temperature of the extract, as by boiling, in the presence of a seed charge, and thereby inducing the formation of the sodalite type compounds.

In this connection it will be appreciated that a principal difference between the digestion process of Figure 8 and the extractions of Figures 14 and 15 resides in the fact that in the former the sodalitic compound is separated in the red mud which is subjected to further treatment, while in the latter the main bulk of the residue is separated prior to the final removal of silica brought about by the sodalite-type silica scavenger; therefore, in the former the digestion is carried out at a temperature, as boiling, facilitating formation of the sodalitic-type compound, while in the latter the extraction is conducted at a lower temperature and the temperature raised only when the silica scavenging step is reached, all pursuant to our present discovery.

Since all of the sodium salts employed in our research were effective in reducing the concentration of silica in sodium aluminate solutions it is to be anticipated that other sodium salts will behave similarly. These may include the salts of both strong and weak inorganic and organic acids. The acid radicals may be mono- or polyvalent, but the data summarized in Figures 2 to 7 indicates, as could not be predicted, that the monovalent negative radical salts, as a class, are more advantageous than the polyvalent salts, and that the chloride and nitrate are more advantageous than the others of the group exemplified therein.

Furthermore, it will be appreciated from Table 5, above, that if it is desired to employ less salt (sodalitic salt former) than in the preferred embodiments, such practice of our invention may be employed to bring about a less complete reduction of the silica content of the solution, as, say to six to twenty-five one-hundredths of a percent of its alumina content, and this step may be combined with differential precipitation of most, say 80 to 90%, of the alumina of the thus largely desilicized solution, as a hydrated alumina having a desirable silica-alumina ratio lower than that of the desilicized solution.

A further principal difference between the second extraction of Fig. 8 and those of Figs. 14 and 15 resides in the fact that the sinter in Fig. 8 contains its own soda, as sodium aluminate, in addition to dicalcium silicate and is substantially free of calcium aluminate, while in the example of Figs. 14 and 15 the sinter is relatively free of soda and contains the calcium as calcium aluminate in addition to the dicalcium silicate. Thus in the embodiment of Figs. 14 and 15 enough $Na_2CO_3$ is supplied in the extractant solution to react with the calcium aluminate and reduce it to sodium aluminate and calcium carbonate; while in the embodiment of Fig. 8, little or no addition of $Na_2CO_3$ is required and that contained in the extractant solution is practically inert, and is not present in the large excess required to throw down an alkali-carbonate sodalitic compound in preference to the alkali chloride sodalitic compound, the same also being true in the modifications referred to above.

Since the solubility of the sodalite is shown by our research (see Fig. 13) to increase with increase in the concentration of NaOH, it will be apparent that an improved desilication may be effected, with slightly less recovery of alumina (see Fig. 1) by using a molar ratio of $Na_2O$ as NaOH to $Al_2O_3$ of approximately 1.5:1.0 in our embodiment of Fig. 8, and that the improved desilication may be effected without decrease in the recovery of the $Al_2O_3$ by employing part of the $CO_2$ (flue gases) to partially neutralize the NaOH between the digestor and the red mud filter in the embodiment of Fig. 8, and between the first filter and the desilicizer boiler in the embodiments of Figs. 14 and 15 and in the sinter-treatment portion of Fig. 8.

Further, we have set forth in detail one manner of synthesizing a representative example of a sodalitic-type compound suitable for seeding in our method. Initial seed may be obtained by employing a part of the sodalitic red mud obtained in the process of Fig. 8, notwithstanding that such material contains some inert ingredients, as the continual dilution of the initial seed charge with newly formed soda lite, and continual withdrawal of portions thereof for return to the sintering kiln effects, gradually a purification of the sodalitic compound circulating in the seed circuit. We prefer, however, to initiate the operation with a substantially pure seed charge of synthesized sodalitic-type compound, which as above indicated may be readily prepared by mixing silica gel with gibbsite and sodium hydroxide, both in a considerable excess relative to the theoretical quantities for combination, and with the sodalitic-compound-forming salt in large excess relative thereto, and inducing formation of the synthetic sodalitic compound by boiling, or preferably by autoclaving, in accordance with our discovery that the formation of the sodalitic compounds is accelerated with increase in temperature. Kaolins corresponding closely to kaolinite ($Al_2O_3 \cdot 2SiO_2 \cdot 2H_2O$) may be employed in lieu of the silica gel and part or all of the gibbsite in this synthesizing procedure with advantage. They yield a finer grained sodalitic seed and with this seed we have successfully reduced the silica content of sodium aluminate solution from 0.8% to less than 0.01% of the alumina content.

In preparing sodalite from kaolin for use in this process, it is especially desirable that the kaolin first be activated by heating for about one hour in the temperature range 700°–900° C. The quantity of sodium hydroxide with which the dehydrated kaolin is treated is preferably in moderate excess of that theoretically required to form sodalite and that of sodium chloride in considerable excess of theoretical requirements. As an example of the procedure, the preparation of a batch of sodalite from kaolin was carried out as follows: The kaolin was first activated by heating it at 700° C. for one hour. A well-mixed batch of 200 g. of the dehydrated kaolin, 100 g. of sodium hydroxide, 150 g. of sodium chloride, and 400 cc. water was placed in an autoclave at 150° C. and maintained at that temperature for four days. The product was then removed, washed with hot water, and dried at 110° C. Chemical analysis gave the following composition:

| | Per cent |
|---|---|
| $Na_2O$ | 18.32 |
| $Al_2O_3$ | 30.47 |
| $Fe_2O_3 + TiO_2$ | 1.67 |
| $SiO_2$ | 36.06 |
| $NaCl$ | 10.53 |
| $H_2O$ (by difference) | 2.90 |
| | 100.00 |

Ignoring the $Fe_2O_3 + TiO_2$ these values correspond to the following molar ratios:

$$0.99 Na_2O : 1.00 Al_2O_3 : 2.01 SiO_2 : 0.61 NaCl : 0.54 H_2O$$

in good agreement with the theoretical molar ratios of sodalite, $$1.00 Na_2O : 1.00 Al_2O_3 : 2.00 SiO_2 : 0.67 NaCl$$

When the synthetic sodalite has been used in the desilication of sodium aluminate solutions of high pH (in the neighborhood of 13.5) some deterioration of the sodalite has been noted when it is used repeatedly. In such case the effectiveness of the sodalite as a desilicizing agent can be completely restored by boiling it for 1 or 2 hours with a strong (saturated or nearly saturated) sodium chloride solution prior to use in a subsequent desilication.

In conclusion it should be pointed out that the processes described in this specification do not require the utilization of those bauxites, kaolins, or clays which have extensive uses in the ceramic industries because of their low content of iron, and that it will be apparent to those skilled in the art that various modifications and applications of our discoveries in addition to those set forth as representative can be made without departing from our invention.

Having described illustrative embodiments exemplifying the practice of our invention, we claim:

1. A method of reducing the concentration of silica in sodium aluminate solutions, which comprises including in the solution a sodium salt capable of forming a sodalitic compound with soda, alumina and silica, separating any insoluble residue from the solution and heating the solution with an added seed-charge of such sodalitic compound to induce the withdrawal of silica from the solution in the form of such sodalitic compound.

2. The method of separating silica from the alumina content of sinters of the lime-bauxite, lime-kaolin type, which consists in extracting such sinters with a sodium carbonate solution containing a substantial amount by weight, compared to the amount of carbonate in the solution, of another salt of sodium which is capable of forming a sodalitic compound with soda, alumina, and silica, at a relatively low temperature, at least approximately as low as about half way between room temperature and boiling, which is unfavorable to formation of such sodalitic compound; separating the liquid extract from the residue formed; and desilicizing the separated extract by heating the same, in the presence of a seed charge of such sodalitic compound, to induce the withdrawal of silica from solution in the form of such sodalitic compound.

3. A method according to claim 2, in which excess sodalitic compound formed, which is not employed for seed-charging subsequent batches, is included in the formation of the sinter to be extracted in such subsequent batches.

4. The method of activating deteriorated sodalitic-seeding material for use in desilicizing sodium aluminate solutions, which consists in boiling the seeding material for a period of about one to two hours in a strong solution of the sodium salt component of the sodalitic material.

EINAR P. FLINT.
LEO SHARTSIS.
LANSING S. WELLS.

REFERENCES CITED

The following references are of record in the file of this patent:

UNITED STATES PATENTS

| Number | Name | Date |
|---|---|---|
| 1,618,105 | Pedersen | Feb. 15, 1927 |
| 2,181,669 | Scholder | Nov. 28, 1939 |
| 2,283,849 | Coles | May 19, 1942 |

FOREIGN PATENTS

| Number | Country | Date |
|---|---|---|
| 252,399 | Great Britain | June 9, 1927 |

OTHER REFERENCES

Mellor: "Inorganic and Theoretical Chemistry," vol. 6, pages 582–583. Longmans, London 1925.